(12) United States Patent
McLuckie et al.

(10) Patent No.: US 7,983,971 B1
(45) Date of Patent: Jul. 19, 2011

(54) ACCOUNTING SYSTEM AND METHOD

(75) Inventors: Timothy M. McLuckie, Rockville, MD (US); Shaun E. Ross, Ashburn, VA (US); Ted Belay, Washington, DC (US); Scott Nestor, Ashburn, VA (US); Abbas Valliani, Reston, VA (US); Bediako George, Washington, DC (US); Jaykumar Menon, McLean, VA (US); Jateendra Gullapalli, Dulles, VA (US); Ana C. Lapera, Reston, VA (US)

(73) Assignee: Fannie Mae, Washington, DC (US)

( * ) Notice: Subject to any disclaimer, the term of this patent is extended or adjusted under 35 U.S.C. 154(b) by 511 days.

(21) Appl. No.: 11/752,408

(22) Filed: May 23, 2007

Related U.S. Application Data

(63) Continuation of application No. 11/698,268, filed on Jan. 25, 2007, now abandoned.

(60) Provisional application No. 60/743,177, filed on Jan. 26, 2006.

(51) Int. Cl.
*G06Q 40/10* (2006.01)
(52) U.S. Cl. .......................... 705/35; 705/30
(58) Field of Classification Search .................. 705/35, 705/30
See application file for complete search history.

(56) References Cited

U.S. PATENT DOCUMENTS

| | | | | |
|---|---|---|---|---|
| 4,876,648 | A | * | 10/1989 | Lloyd ............................. 705/38 |
| 5,802,500 | A | * | 9/1998 | Ryan et al. .................. 705/36 R |
| 7,062,458 | B2 | | 6/2006 | Maggioncalda et al. |
| 7,165,174 | B1 | | 1/2007 | Ginter et al. |
| 2002/0035520 | A1 | | 3/2002 | Weiss |
| 2005/0222931 | A1 | | 10/2005 | Mamou et al. |
| 2007/0011126 | A1 | | 1/2007 | Conner et al. |
| 2007/0061487 | A1 | | 3/2007 | Moore et al. |

OTHER PUBLICATIONS

Sun Microsystems, Inc., "Foundation for SOA in Financial Services," white paper, Jun. 2006.
Princeton Financial Systems, "Portfolio Management and Accounting Solutions," http://www.pfs.com/overview/overview.asp, 2002.
Sun Microsystems, Inc. "Financial Services SOA Fast Composition of Stable, Flexible Financial Applications," 2006.
Eric A. Marks and Michael Bell, "Service-Oriented Architecture A Planning and Implementation Guide for Business and Technology," 2006, John Wiley and Sons, Inc. Hoboken, New Jersey.

* cited by examiner

*Primary Examiner* — Kirsten S Apple
*Assistant Examiner* — Abdul Basit
(74) *Attorney, Agent, or Firm* — Foley & Lardner LLP

(57) ABSTRACT

A computerized accounting system is described herein. At least a portion of the accounting system may have a service oriented architecture. The accounting system may include an accounting service that is capable of storing versioned accounting policies. The various accounting policies may be used to process accounting data to determine the effect of the various accounting policies on the financial results. Also, the accounting system may include an event processing framework which, in one embodiment, may be used to amortize loans, securities and/or guaranty fee items.

10 Claims, 23 Drawing Sheets

ACCOUNTING SYSTEM AND METHOD

CROSS-REFERENCE TO RELATED PATENT APPLICATION

This application is a Continuation of U.S. patent application Ser. No. 11/698,268, filed Jan. 25, 2007, incorporated herein by reference in its entirety, which claims priority from U.S. Provisional Application No. 60/743,177, filed Jan. 26, 2006, incorporated herein by reference in its entirety.

BACKGROUND

Computer based accounting systems have been available for a number of years. These systems may be used to record and process accounting transactions or events. Typically, these systems have the ability to track accounts payable, accounts receivable, payroll, expenses, and so forth. Although these systems have a number of valuable uses, they also suffer from a number of shortcomings. These shortcomings are more readily apparent as the complexity and volume of the financial transactions being processed increases.

Many computerized accounting systems are not very flexible and are difficult to modify, especially at a high level. The inflexible nature of the accounting systems stems from accounting policies and data retrieval and processing functions being implemented throughout the system at varying locations and in varying forms. Any change to one single location may result in unforeseen changes throughout the system. Thus, any change in accounting policy, financial data, etc. often requires a significant amount of rewriting of the underlying code to implement the change.

Some applications where conventional accounting systems might be overly rigid include the amortization of large numbers of deferred price adjustments from loans, securities, etc. In particular, conventional accounting systems may be especially difficult to use to process large amounts of historical and/or prospective financial data. This problem may be particularly acute if changes must be made to the system before the data can be reprocessed.

An improved computerized accounting system is described herein that may be used to process financial data or transactions pertaining to financial instruments, such as loans, asset backed securities, and so on. In particular, the improved computer systems and methods may be used to perform financial accounting functions such amortizing loans, amortizing deferred price adjustments on the loans, securities, and guaranty fees, and the like. The improved computerized accounting system may be used to easily change various aspects of the system such as accounting policies, etc. The improved financial accounting systems and methods are intended to provide accurate and timely accounting of various accounting events.

SUMMARY

A computerized accounting system is described herein which may utilize a service oriented architecture or service framework to record and process financial data. The service oriented framework includes loosely coupled, highly interoperable application services that form a modular and data independent framework for recording and processing various accounting events or transactions (e.g., financial transactions). These services may interoperate with each other based on a formal definition independent of the underlying platform/programming language (e.g., web services, custom definitions, and so forth). The software components of the various services can be reused (e.g. the same C# service may be used by a Java application and/or any other programming language which can access the service) due to the virtue of the interface definition being defined in a standards-compliant manner which encapsulates/hides the vendor/language-specific implementation from the calling client/service.

The computerized accounting system may include one or more policy services where policies such as the accounting treatment of various accounting events are stored. The policies may be updated and versioned as policies change over time. The system may be configured to process new or historical financial data using any of the versioned policies. In other words, each time an accounting policy or other policy is changed a new version of the accounting policy is created. In one embodiment, each time that any change is made to any of the accounting policies a new version is created of the entire set of accounting policies. In another embodiment, each individual policy may be modified to form a version of only that particular policy while the remainder of the policies are unchanged. In this embodiment, a periodic version of the entire set of accounting policies may be taken for historical or other purposes.

The different versions of the accounting policies may be used in a number of different ways and for a number of different purposes. For example, the versioned accounting policies may be used to process the financial data using two different versions of the accounting policies to determine how each policy affects the financial results of the financial institution. This information may be used to allow an institution to determine how two equally applicable yet alternative accounting policies or other policies will affect the institution before those policies are implemented.

The accounting system may also include an event processing framework or component. The event processing component is the portion of the system that is responsible for processing one or more accounting events (e.g., a financial transaction, and so forth). The event processing component includes most or, desirably, all of the logic that is associated with the handling of a particular accounting event. It should be appreciated that the reference to "accounting event" is meant to broadly refer to any event or input that can or should be taken into account by the accounting system. In one embodiment, the event processing component may include one type of event processor for every type of event. It should be appreciated, however, that multiple event processors may be capable of running at the same time. The event processors may use lookups to access lookup services that allow the event processor to acquire additional information from other services to process a particular event. The event processing component may be configured as a generic component that may be used to process any event in any other type of system. In order to use the event processing component in other systems, the logic used to handle the particular events that are to be input into the event processing component may need to be updated to reflect the specific type of events which are being handled.

The accounting system may be used to accurately and reliability process large quantities of financial data. For example, the accounting system may be used to amortize large numbers of loans, securities, and/or guaranty fee items. The accounting policies and/or any other policies may be versioned to allow for greater flexibility to modify the accounting system. In addition, the financial data used in the accounting system may also be warehoused and accessed separately from an amortization engine used to amortize the loans and/or securities and guaranty fee items.

DRAWINGS

DETAILED DESCRIPTION

Figure 1:
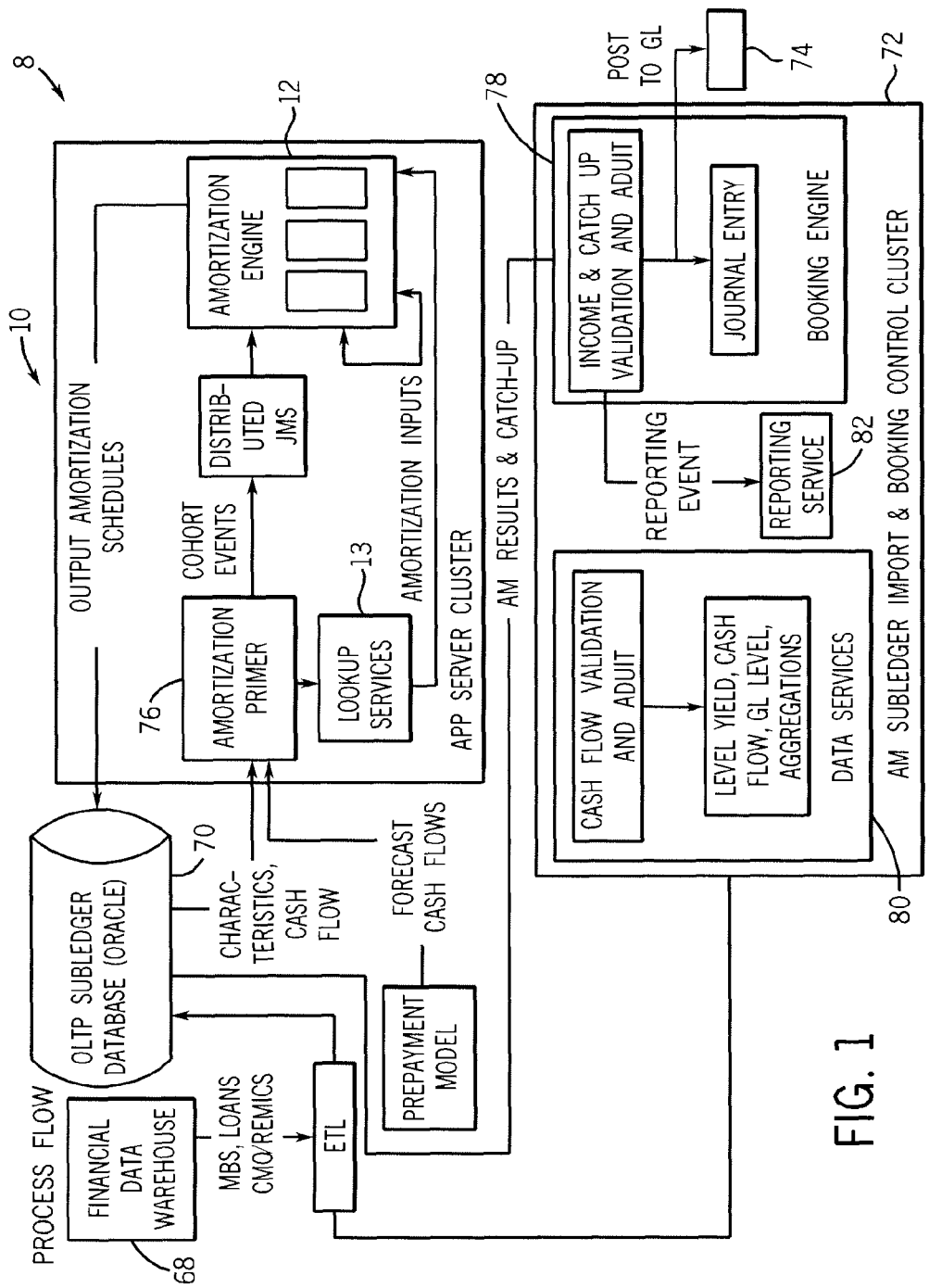
FIG. 1 shows a diagram of one embodiment of a computerized accounting system.

A computerized financial accounting system is described herein. In general, the computerized accounting system may have an event processing and service oriented architecture (SOA). The modular and data independent nature of the SOA framework facilitates the ease of future enhancements and modifications to the accounting system. Thus, the accounting system may be an extensible, adaptable, and a fully auditable system that can easily integrate with one or more larger or smaller systems (e.g., accounting systems) or operate as a stand-alone system.

A service-oriented architecture refers to a system where different functionalities required by the system to accomplish a particular task are split into independent parts or services. This results in a set of loosely coupled services that can call each other to accomplish a task. Since the services are loosely coupled, each service may be modified without affecting the remainder of the system. As a result, auditing and modifying the system are significantly easier than conventional accounting systems.

The services may interoperate with each other based on a formal definition which is independent of the underlying platform/programming language used for each service. Thus, the use of a service oriented architecture renders the accounting system independent of the development technology (such as Java and .NET) used to develop each service. The software components that make up each service can be customized and modified separately so long as the interface between each service remains the same. Thus, a service based on Java may be called by another service or application which is based on C++. Any other service or application developed using any other programming language can access the services due to the virtue of the interface protocol being defined in a standards-compliant manner which encapsulates/hides the vendor/language-specific implementation from the calling client/service. In one embodiment, communication with the services is accomplished using WSDL (e.g., the services may be considered web services). In other embodiments, any standard communication protocol may be used to facilitate communication between the services, including custom defined protocols and other protocols in addition to WSDL such as SOAP, XML, HTTP, UDDI, and so forth.

In the context of the computerized accounting system, the loosely coupled, highly interoperable application services form a modular and data independent framework for recording and processing various accounting events or transactions. As the requirements of the accounting system change (e.g. aggregation level of data used to amortize various cash flows such as loans, securities, etc.) the modular nature of the accounting system allows it to be adapted without making extensive modifications to the underlying components.

In one embodiment, the accounting system described herein includes an amortization component or engine that is used to amortize various cash flows such as from loans and/or securities. In particular, the accounting system may be used to amortize deferred price adjustments for various cash flows such as mortgage loans and/or mortgage backed securities. It should be appreciated that although much of the remainder of this disclosure refers to the accounting system as including an amortization engine which is used to amortize deferred price adjustments of loans and/or securities, the amortization engine can also be used in other contexts as a generic event processor. Also, it should be appreciated that the accounting system may include any combination of components such as the amortization engine, data storage component, and so forth.

FIG. 1 shows a diagram of one embodiment of a computerized accounting system 8, which may be used to process a variety of accounting data and/or perform a variety of accounting processes. The computerized accounting system 8 includes a financial data warehouse 68, a sub-ledger database 70, a sub-ledger control system 72, a general ledger database 74, and an amortization system 10. The configuration of the computerized accounting system 8 shown in FIG. 1 may be especially useful for reprocessing large amounts of historical financial data. In situations where the accounting system 8 is used to process accounting data as it is received (i.e., in real-time), the amortization primer 76 and/or many of the components in the sub-ledger control system 72 may not be needed. It should be appreciated that, depending on the amount of data, these components may also not be needed to reprocess historical financial data. For larger projects, however, these components may be desirable to make processing more efficient and/or faster.

The financial data warehouse 68 may be used to store a variety of financial data such as data related to any of a number of financial transactions or events. In one embodiment, the financial data warehouse 68 includes financial data related to mortgage backed securities, loans such as real estate collaterized loans (e.g., mortgages), and/or collaterized mortgage obligations (CMOs)/real estate investment mortgage conduits (Remics), and historical data on guaranty fee items.

The data services component 80 of the sub-ledger control system 72 is used to control the extraction, transformation, and loading (ETL) process that extracts and transforms (if required) loan, security and/or guaranty fee data from the financial data warehouse 68 and populates the sub-ledger database 70. The data extracted from the financial data warehouse 68 and populated to the sub-ledger database 70 includes financial instrument positions, historic cash flows, and so forth. The output from the amortization system 10 is populated to the sub-ledger 70. From there, the amortization results may be provided to the booking engine 78 in the sub-ledger control system 72. The booking engine 78 may be used to validate and audit the amortization results and create journal entries using the results. The results may also be posted to the general ledger 74 by the booking engine 78. A reporting service 82 may be used to produce any of a number of reports (e.g., greater than 35 reports) related to amortization, sub-ledger, and/or journal entry activities.

As mentioned previously, the accounting system 8 may be configured to process various amounts of financial data, which means that the amortization system 10 likewise may be configured to process various amounts of financial data. In one embodiment, application service clustering may be used to provide scalability to the accounting system 8 and/or the amortization system 10. In one embodiment, as shown in FIG. 1, a distributed Java messaging service (JMS) queue may be implemented across the application server cluster to leverage the resources of multiple physical machines. Numerous other configurations may be used also to provide scalability.

As shown in FIG. 1, the amortization system 10 includes an event processing or amortization engine 12. Although the engine 12 is referred to herein primarily as an amortization engine, it should be appreciated that the engine 12 may be used as a generic processing engine to process any event. The engine 12 may be used with other types of systems other than accounting systems in order to process any desired event (e.g., business events). The amortization engine 12 includes a number of components such as an input component, a processing component, and an output component. In one embodiment, the various components operate asynchronously. A workflow manager may be used to control the various components of the amortization engine 12. In one embodiment, the operation of the various components may be coordinated using JMS (using serialized objects). In another embodiment, the various components of the amortization engine 12 may operate synchronously, thereby reducing or eliminating the need for the workflow manager.

It should be appreciated that the accounting system 8 shown in FIG. 1 represents only a single embodiment of the accounting system 8 and that multiple other embodiments may be created. The additional embodiments may include the various components shown in FIG. 1 or may include additional components as desired. Thus, the particular configuration of the components of the accounting system 8 shown in FIG. 1 should not be considered limiting in any way.

The accounting system 8 may also be designed to make it compatible with requirements associated with the Sarbanes-Oxley Act, which include separation of duties so that the accounting systems are independent of the analytic systems. The services based framework of the amortization system 10 allows for the separation of duties to services in order to make it simpler to meet these requirements. In the event that future requirements are implemented, either by law and/or regulation, these too may be easily incorporated into the accounting system 8 by virtue of its modularity and the loose coupling of the various components or services.

The accounting system 8 may also be configured to be audit friendly. In other words, the accounting system 8 may be configured so that for every accounting result produced, a methodology exists for explaining how that result was produced and how it can be verified as correct. The accounting system 8 can allow traceability to all decision points. In one embodiment, the accounting system 8 may be configured to produce accounting results and process financial data going back at least 7 years.

In general, the purpose of the accounting system 8 is to accurately measure the financial impact of a financial institution's business activities. In one sense, this means that every accounting result created using the accounting system 8 is an empirical representation of the value of work performed by financial institution's business. Thus, the accounting system 8 may be used to connect every accounting result created to the relevant set of business activities that produced the accounting result. This may allow the financial institution to quickly identify business activities that result in superior financial results to determine what factors contributed towards the results in order to enhance or replicate those factors in other businesses. On the flip side, the financial institution may be capable of quickly identifying business activities that result in disappointing financial results in order to determine the root cause of the results and identify corrective measures that may be taken.

The accounting system 8 may also be capable of beginning to account for a accounting event as soon as the event occurs. This may allow the financial institution to get a better measurement of the financial impact of its business activities. The potential advantage is that a more up to date picture of the state of the business can be presented at any time, and any inconsistencies present in the accounting data can be identified earlier in the accounting period rather than later. In one embodiment, the amortization system 10 of the accounting system 8 may be capable of supporting the immediate processing of discrete events.

In some instances, the financial institution may want to determine the financial impact of any accounting policy changes or other corrections to historical business data. The financial impact of any changes can be determined by comparing the current state of accounting results with the new recalculated state of the accounting results. The difference between the two sets of values represents the set of the adjustments that can be applied to bring the current state of accounting data to it new state. The accounting system 8 is capable of comparing different accounting results efficiently easily due, at least in part, to the ease associated with versioning financial data and/or accounting policy.

For example, it may be desirable to determine the impact of changes to the cohorting scheme used to package deferred price adjustments on the accounting results. Changes to the cohorting scheme may include a change in the unpaid principal balance (UPB) or a new acquisition. As a result of such a change, all deferred price adjustments that belong to the affected cohort may have to be amortized again. The previous results generated by processing the affected cohort may be archived and replaced with the updated results instead. If for some reason it is desirable to review the previous results, they may be versioned and stored or logged in the accounting system 8.

Figure 2:
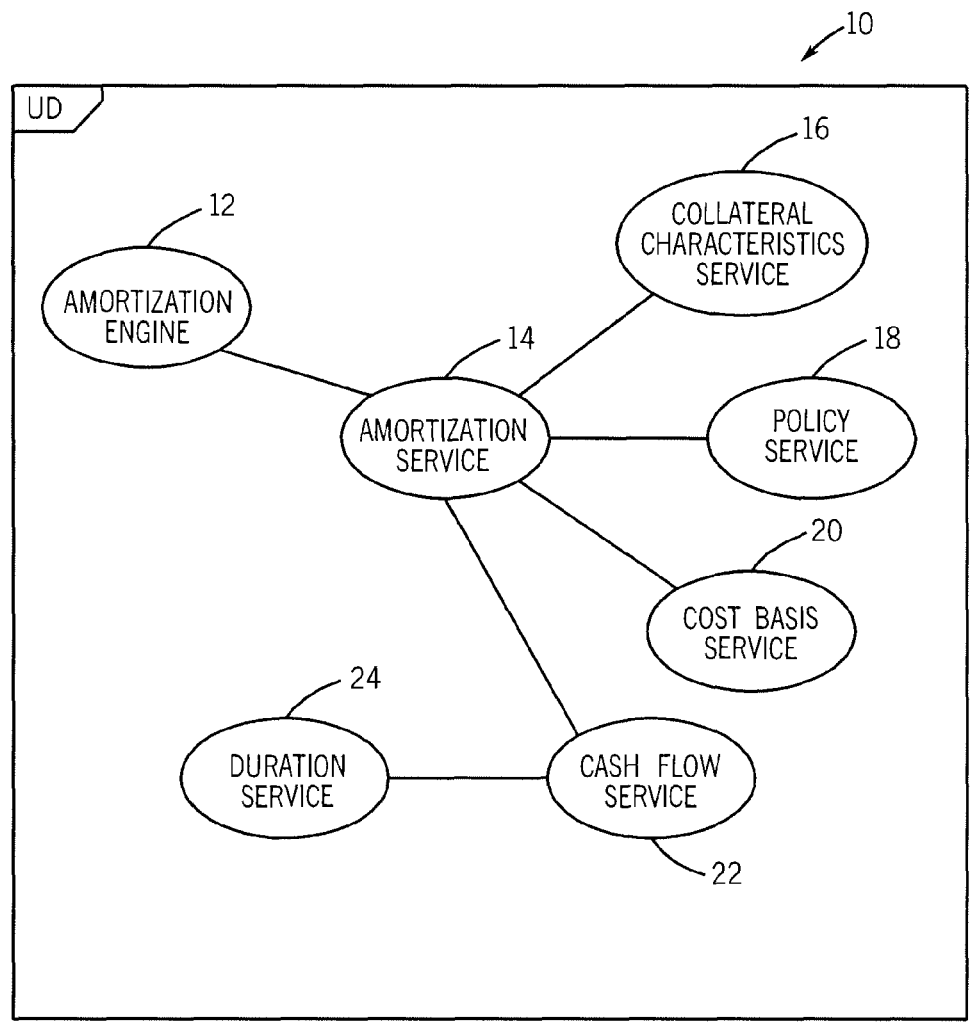
FIG. 2 shows a diagram of one embodiment of an amortization system that may be used with the accounting system.

FIG. 2 shows a diagram of one embodiment of the amortization system 10 shown in FIG. 1. The amortization system 10 is shown as being implemented using a service oriented architecture. The amortization system 10 may be used to amortize any cash flow such as loans (e.g., mortgage loans), securities (mortgage backed securities), and the like.

Figure 3:
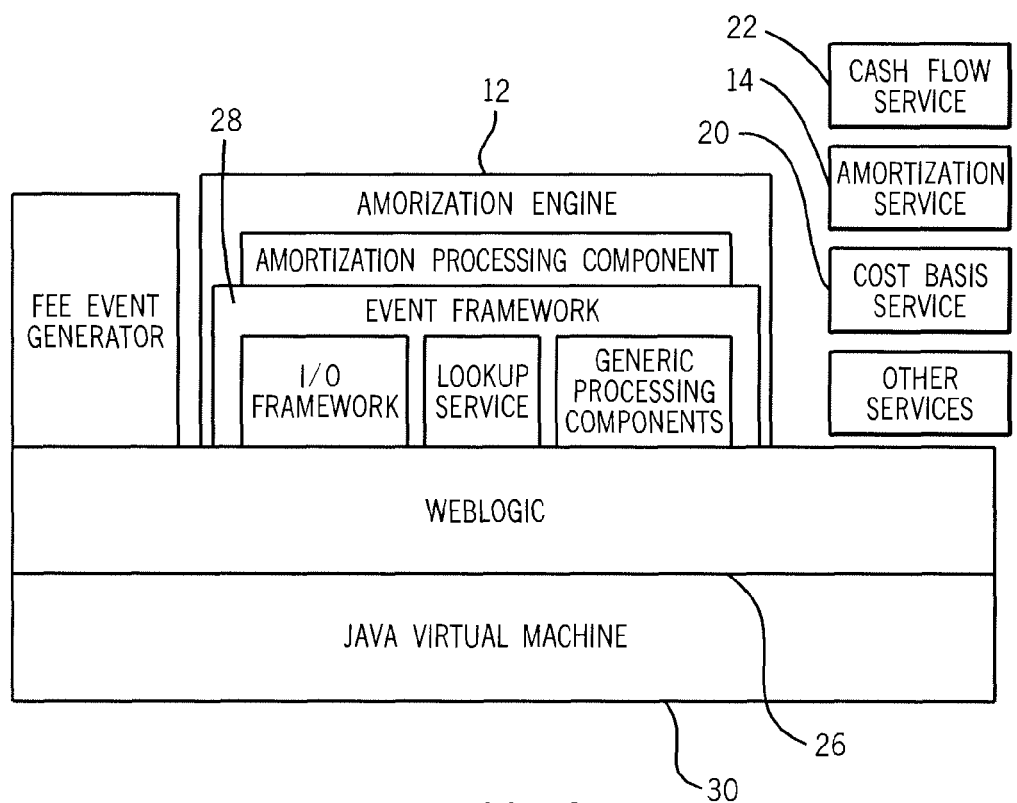
FIG. 3 shows a diagram of one embodiment of an amortization engine and service layer used in the amortization system.

The embodiment of the amortization system 10 shown in FIG. 2 can be broken down into two sections: an amortization engine 12 and one or more services 13 (FIG. 3). The amortization engine 12 uses the services 13 to access supporting data and create the amortization schedule. The services may include an amortization service 14, a collateral characteristics service 16, a policy service 18, a cost basis service 20, a cash flow service 22, and a duration service 24. It should be appreciated that the amortization system 10 may also include any of a number of other suitable services or engines as the circumstances may require and that the embodiment shown in FIG. 2 is meant to be exemplary of one of many suitable embodiments of the amortization system 10. It should also be appreciated that although the application services 13 are shown as being included as part of the amortization system 10, the application services 13 may also be thought of as being included as part of the accounting system 8 separate from the amortization system 10.

The amortization engine 12 is used to process accounting data (e.g., accounting events or transactions) that require generating an amortization schedule. Typically, the accounting data related to loans and/or securities is processed using the amortization engine 12. The amortization engine 12 may be configured to use the amortization service 14 to obtain the necessary information from the other services and/or generate an amortization schedule. The amortization service 14 obtains information regarding the collateral characteristics, policy, historical and/or prospective cash flows, and cost basis positions for the loans and/or securities that are being amortized. This information can be obtained from the collateral characteristics service 16, policy service 18, cost basis service 20, and/or cash flow service 22. It should also be appreciated that any other service such as the duration service 24, that may use information regarding cash flows, but does not use information on cost basis, policy, or collateral characteristics can utilize the same cash flow service 22 as the amortization service 14. Thus, reuse of the functionality provided by each service is simple and there is only one code base to maintain for each of the multiple services.

It should be appreciated that the amortization engine 12 may be combined with the amortization service 14 so that the amortization engine 12 includes the functionality provided by the amortization service 14. Although it is preferable to decouple the two components in order to provide greater flexibility to the amortization system 10, it may be desirable in certain instances to combine the functionality of the two components into a single component.

It should be appreciated that the amortization engine 12 may be built upon any suitable infrastructure. For example, in one embodiment, the amortization engine 12 may be built upon a J2EE infrastructure (WebLogic application server 26), which provides the low level functionality. The Weblogic may be deployed on top of java virtual machine 30 as shown in FIG. 3. The event framework 28 is a generic layer that is used to take care of how data input is received into the amortization engine 12 and processing output is persisted. Another feature of the event framework 28 is to provide generic processing components. For example, the event framework layer 28 may include an amortization specific implementation of the generic processing component that is used to pass data to the amortization service 14, which, in turn, creates the amortization schedule. Once the schedule is created, the amortization-processing component can use the I/O framework to persist the amortization schedule. The event framework, however, may also include various other implementations of the generic processing components.

As mentioned previously, the service oriented architecture of the amortization system 10 may provide a number of advantages. Due to its extensible modular framework, the amortization system 10 may be flexible enough to adapt to changes in the requirements associated with the amortization system 10. For example, the amortization system 10 may be more flexible because it is data aggregation independent, or, in other words, the services and event processing framework 28 included in the amortization engine 12 are decoupled from the data aggregation level. Also, because the amortization system 10 uses a modular extensible framework, it is simple to integrate with other financial accounting components or systems. The other financial systems may be configured to use any number or combination of the components shown in the amortization system 10.

In one embodiment, communication between the amortization engine 12 and the services 13 may be accomplished without transforming the message into XML. This may be done to increase performance of the amortization system 10 during multiple, high volume "runs." The lookup service facades 54 may use adapters to directly populate input value objects from amortization domain objects. This effectively maintains the independence of all services involved without the overhead of a POJO->XML->VO transformation. This strategy is particularly useful when all of the services are developed by the same entity. However, in other situations where the services 13 are not developed by the same entity then a more widely accepted standard communication protocol may be used (e.g., web services).

Establishing formal, functional boundaries between the services 13 has several benefits. The services 13 can be developed and tested independently and are completely agnostic of the context in which they are used (they are stateless). Further, they can be deployed on separate hardware platforms and scaled as needed to achieve desired performance goals. In addition, isolating business functions as services 13 provides a mechanism by which evolving implementations can be "swapped in," ideally without affecting the external interface (API).

The amortization system 10 is capable of running and amortizing loan and/or securities data such as accounting events (e.g., deferred price adjustments) for a policy-defined period, such as monthly, quarterly, or real-time. The event driven nature of the amortization system 10, which is described in greater detail below, allows the amortization system 10 to accept accounting events individually and/or as a group in real time or at a specified time as defined by the applicable accounting policy.

The amortization system 10 may also be configured to process financial data at either a group or a granular level. For example, in one embodiment, the accounting system 8 may be configured to receive and process all data received from the business operations of the financial institution at a granular level. In another embodiment, the financial data may be aggregated into larger groups, which are referred to herein as cohorts. The accounting policy may be used to determine whether various financial data is grouped together to form a cohort or not. The members of these cohorts may be tracked in order to support a materiality analysis of the various accounting policies being implemented in the accounting system 8.

A cohort can be any accounting events or transactions that merit being grouped together for accounting purposes. For example, a cohort of securities related deferred price adjustments is a collection of deferred price adjustments that are grouped together by the common characteristics of their associated securities. Table 1 shows an example of a cohort that is defined by origination year, agency, and coupon rate. The cohort is identified by the cohort id of "CO1."

TABLE 1

| Cohort Identifier | Origination Year | Coupon (%) | Agency |
|---|---|---|---|
| CO1 | 1993 | 6.8 | XYZ |

Table 2 shows a group of mortgage-backed securities that belong to this cohort ("CO1") on the basis of their common characteristics.

TABLE 2

| CUSIP | Product Type | Term (years) | Origination Year | Coupon (%) | WALA (years) |
|---|---|---|---|---|---|
| CU1 | MBS | 30 | 1993 | 6.8 | 11 |
| CU2 | MBS | 30 | 1993 | 6.8 | 11 |
| CU3 | MBS | 30 | 1993 | 6.8 | 11 |

Associated with each of the securities shown in Table 2 are deferred price adjustments that occurred as a result of financial transactions. Table 3 shows the attributes of each of these deferred price adjustments. It should be noted that more than one deferred price adjustment can be associated with a particular security (CUSIP).

TABLE 3

| DPA Identifier | Piece Identifier | Prem/Disc ($) | Expected Settlement Date | Settlement Date | Purchase UPB ($) | PAR ($) | CUSIP |
|---|---|---|---|---|---|---|---|
| F1 | P1 | 100,000 | Jan. 1, 2003 | Jan. 1, 2003 | 500,000 | 700,000 | CU1 |
| F2 | P2 | 200,000 | Feb. 1, 2003 | Feb. 1, 2003 | 1,000,000 | 1,700,000 | CU1 |
| F3 | P3 | 50,000 | Jan. 1, 2004 | Jan. 1, 2004 | 800,000 | 1,000,000 | CU2 |
| F4 | P4 | 75,000 | Jan. 15, 2003 | Jan. 17, 2003 | 1,500,000 | 2,000,000 | CU3 |
| F5 | P5 | 100,000 | Nov. 3, 2004 | Nov. 3, 2004 | 900,000 | 1,900,000 | CU3 |

Using the information describing the cohorts, securities, and deferred price adjustments, a single cohort sub-group (cohort event) can be created and identified by the event id "E1." Table 4 shows the characteristics of the cohort event E1.

TABLE 4

| Event Identifier | Product Type | Cohort Identifier | CUSIP | DPA Identifier | Piece Identifier | Prem/Disc ($) | UPB ($) | PAR ($) | Settlement Date |
|---|---|---|---|---|---|---|---|---|---|
| E1 | MBS | CO1 | CU1 | F1 | P1 | 100,000 | 500,000 | 700,000 | Jan. 1, 2003 |
| E1 | MBS | CO1 | CU1 | F2 | P2 | 200,000 | 1,000,000 | 1,700,000 | Feb. 1, 2003 |
| E1 | MBS | CO1 | CU2 | F3 | P3 | 50,000 | 800,000 | 1,000,000 | Jan. 1, 2004 |
| E1 | MBS | CO1 | CU3 | F4 | P4 | 75,000 | 1,500,000 | 2,000,000 | Jan. 17, 2003 |
| E1 | MBS | CO1 | CU3 | F5 | P5 | 100,000 | 900,000 | 1,900,000 | Nov. 3, 2004 |

Using the prepay cohort identifier (CO1) (i.e., the propensity for prepayment of the underlying mortgages) and the CUSIP (CU1), both the historic and prospective cash flows for this security can be retrieved by the cash flow service. To determine level yield calculations, a combination of cohort level prospective cash flows and security (CUSIP) level historic cash flows may be constructed as shown in Table 5.

TABLE 5

| Cash Flow Type | Key Type | Period Identifier | Historic | Prospective | Combined Factors |
|---|---|---|---|---|---|
| Historic | CU1 | 0 | 1 | — | 1 |
| Historic | CU1 | 1 | 0.997 | — | 0.997 |
| Historic | CU1 | ... | ... | ... | ... |
| Historic | CU1 | 132 | 0.67 | — | 0.67 |
| Prospective | CO1 | 133 | 0.65 | 1 | 0.650 (1 × .650) |
| Prospective | CO1 | 134 | — | 0.992 | 0.6448 (.992 × .650) |
| Prospective | CO1 | ... | ... | ... | ... |
| Prospective | CO1 | 256 | — | 0 | 0 |

In one embodiment, the accounting system 8 may be capable of providing any of a number of reports using any of the information in the system. The accounting system 8 may be configured to have two different reporting capabilities—accounting reporting and analytic reporting. Accounting reporting may be used to indicate the characteristics of an amortization run. Some of the data that may be included in the accounting reporting portion may include: total deferred price adjustments processed, total cohorts processed, number of instruments defaulted by method, detailed deferred price adjustments that resulted in errors, materiality of errors.

Figure 4:
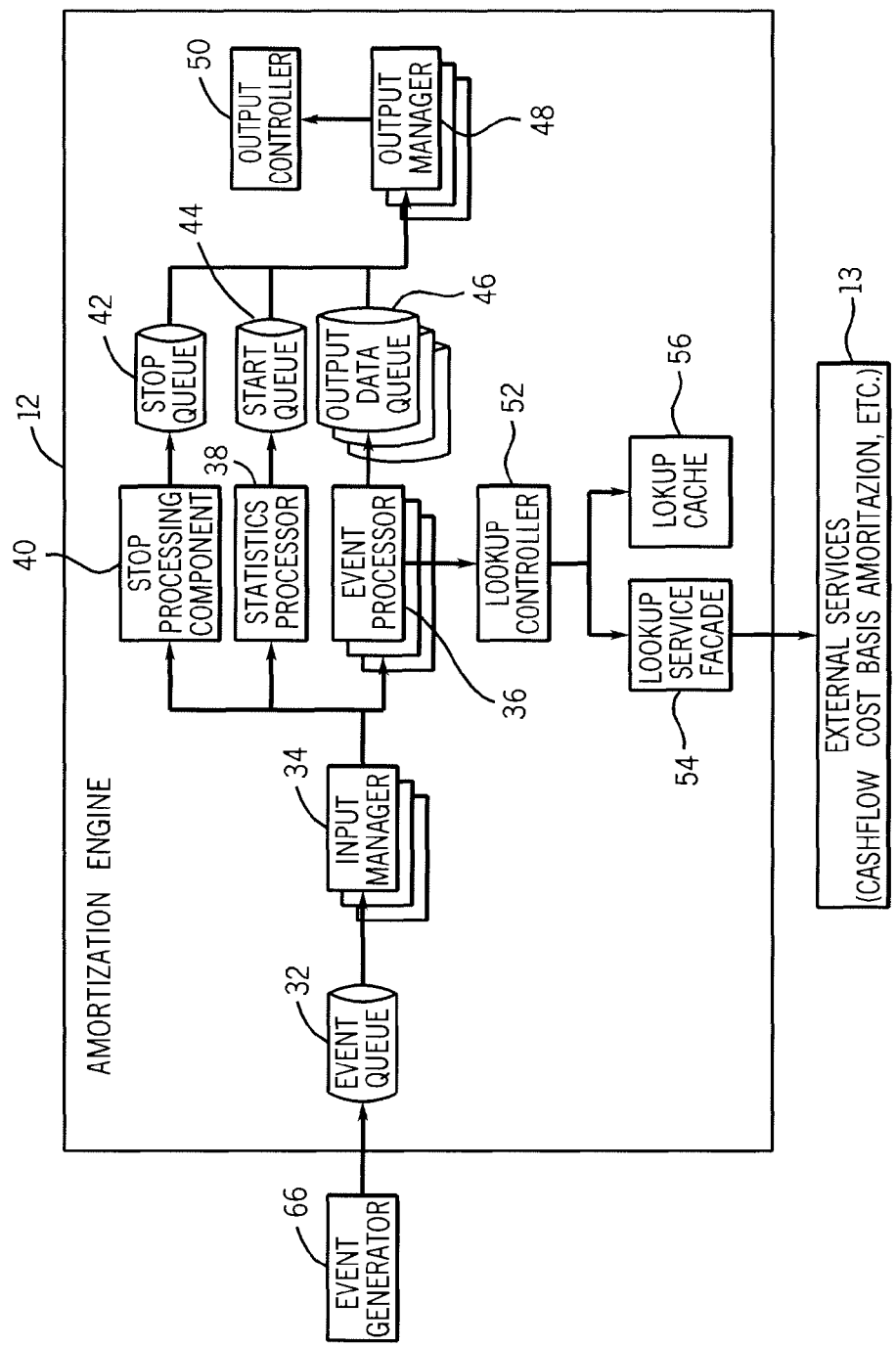
FIG. 4 shows a block diagram of one embodiment of an event processing framework used by the amortization engine.

Referring to FIG. 4, the amortization engine 12 includes an event processing framework. The event processing framework can generally be described as having four sections, namely data input, event processing, data output persistence, and service lookup. As shown in FIG. 4, the data input section may include an event queue 32 and an input manager 34. The event processing section may include an event processor 36, a statistics processor 38, and a stop processing component 40. The data output persistence section includes a stop queue 42, a status queue 44, an output data queue 46, an output manager 48, and an output controller 50. The service lookup section may include a lookup controller 52, a lookup service facade 54, and a lookup cache 56. It should be appreciated that this configuration of the amortization engine 12 is exemplary of many configurations of the amortization engine 12 that may be used.

The input managers 34 are the components responsible for ingesting events from the outside, validating and preparing those events for the event processing component, and submitting those validated and prepared events to the appropriate event processing component. The input managers 34 are the initial point of entry of events into the amortization engine 12.

In one embodiment, the input managers 34 receive events that have been grouped into policy-defined cohorts from the outside (e.g., other components of the accounting system 8, a user, and so forth) and pass those events on to the appropriate event processing component. For monitoring purposes, the input managers 34 may also create a statistics event to indicate the reception and submission of the event to the event processing component.

The event processor 36 is the component responsible for processing an accounting event. In one embodiment, the business logic used to determine the handling of the event can be accessed entirely within the event processor 36. Consequently, in this embodiment, access to other services 13 by the amortization engine 12 occurs from within the event processor 36. It should be appreciated, however, that in other embodiments, various other sections or components of the amortization engine 12 may be used to access one or more of the external services 13. In one embodiment, there is one type of event processor 36 for each type of event so that the amortization engine 12 includes multiple event processors 36. Although there may be one type of event processor 36 for each type of event, multiple instances of the event processor 36 can run at the same time.

Figure 5:
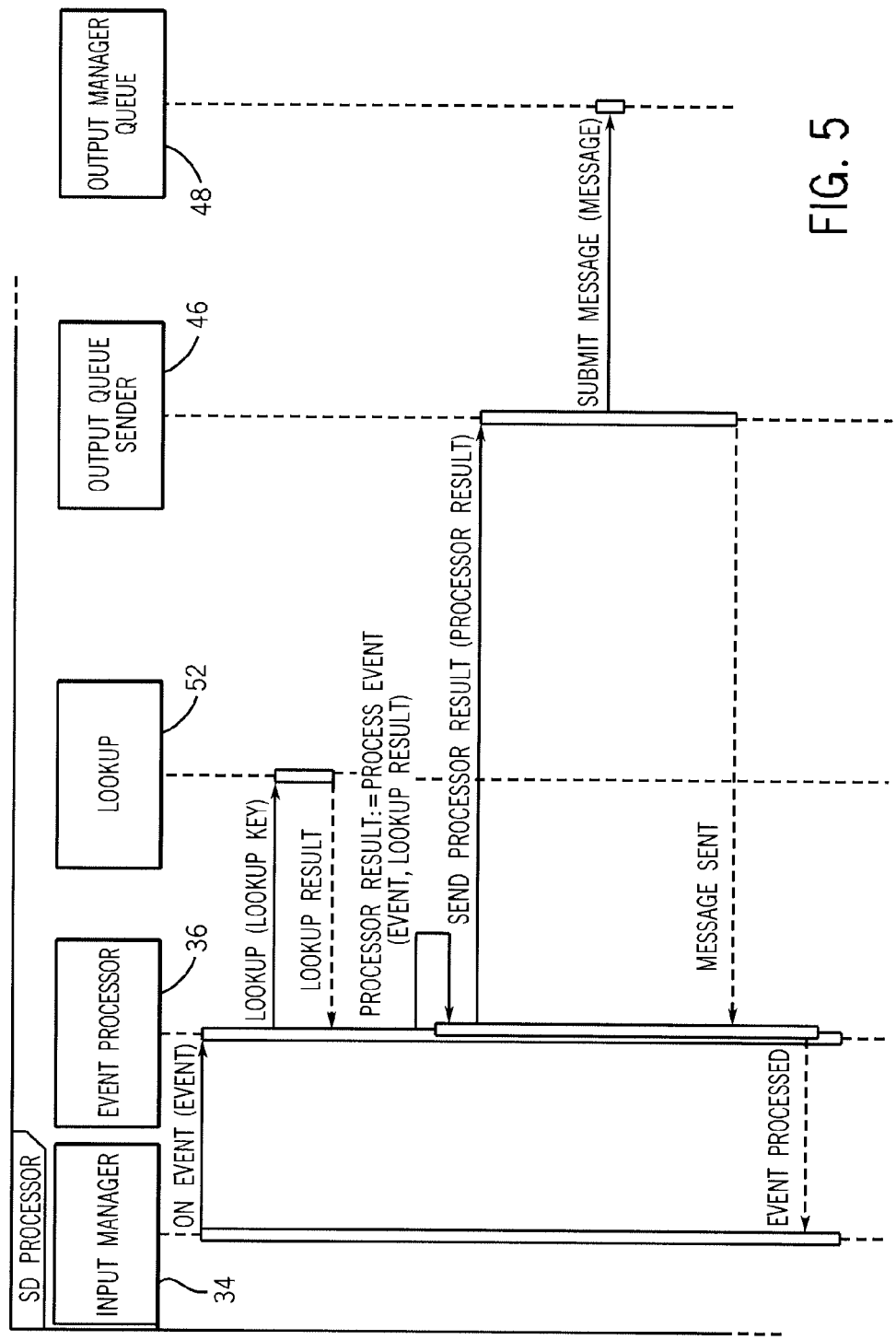
FIG. 5 shows the basic flow of an event processor sequence in an event processing framework.

The event processor 36 may use lookups to access the services 13 to acquire any additional information needed to process a particular event. FIG. 5 shows a sequence diagram of one embodiment of the operation of the event processor 36. The services 13 are isolated from the event processors 36 by the lookup. In addition to regular event processors 36, there are two special event processors, the statistics processor 38 and the stop-processing component 40. As each accounting event is processed by amortization engine 12, a statistics event may be submitted to the statistics processor 38. The function of the statistics processor 38 is to save processing statistics generated by the various event framework components. These statistics can include information such total processing time, group processing time, event id, group id, and the like.

The stop-processing component 40 is responsible for stop group processing requests. Stop requests can be of two types—stop processing and abort processing. A stop processing request causes all events in the event queue 32 to be redirected to the stop-processing component 40 and then to the stop queue 42. All events that are already in the processing state are allowed to finish processing, but all events that have been sent to the stop queue 42 are not processed. Statistics on the non-processed events are kept to maintain processing statistics. An abort-processing request causes all events in the event queue 32 to be flushed. The events that have already begun to be processed are allowed to finish processing. Statistics on the non-processed events are not kept, and the statistics collected at the point of receiving the abort processing request are ignored.

The results from the event processor 36 that are slated to be output are managed by the output controller 50 in conjunction with one or more of output managers 48. The output controller 50 has two responsibilities. First, the output controller 50 manages the data discharge of the output managers 48 to a database so that higher priority output managers 48 discharge their data first after which lower priority output managers 48 are allowed to discharge data. Second, the output controller 50 keeps track of group statistics and reports whenever a group is finished.

The output managers 48 receive events from the output queue 46 of the event processing components and then persist the events to the database. The output managers 48 may be configured to not have any knowledge of the priority level of the event data and, therefore, prior to pulling event results from the output data queue 46, the output manager 48 may call the output controller 50 to determine if it is allow to discharge results to the database. The output managers 48 may have the capability of discharging several sets of results at a time to the persistent store. A specialized output manager 48 may be used in order to facilitate the stop group mechanisms. This specialized output manager 48 may not persist any results provided to it, but instead discards them.

Referring to FIG. 5, a sequence diagram of the operation of one embodiment of the amortization engine 12 is shown. As shown in the sequence diagram, an event is passed from the input manager 34 to the event processor 36 to be processed. In this example, the event processor 36 determines that additional information is needed to process the event. The event processor 36 uses the lookup controller 52 to lookup the additional information from one of the services 13. The lookup result is sent back to the event processor 36 where the event is successfully processed. The result is sent from the event processor 36 to the output data queue 46, which sends a message to the output manager 48 that contains the result. The event processor 36 is notified that the message was sent to the output manager 48, and the event processor 36, in turn, notifies the input manager 34 that the event was successfully processed.

The lookups 52 act as an abstraction layer between the event processors 36 and the external services 13. In one embodiment, the lookups may be synchronous lookups. These lookups may be implemented in any suitable manner. For example, the lookups may be implemented as ordinary java objects. The implementations that the lookups wrap, however, may be construed of more complicated java constructs including web services and Enterprise JavaBeans objects.

Figure 6:
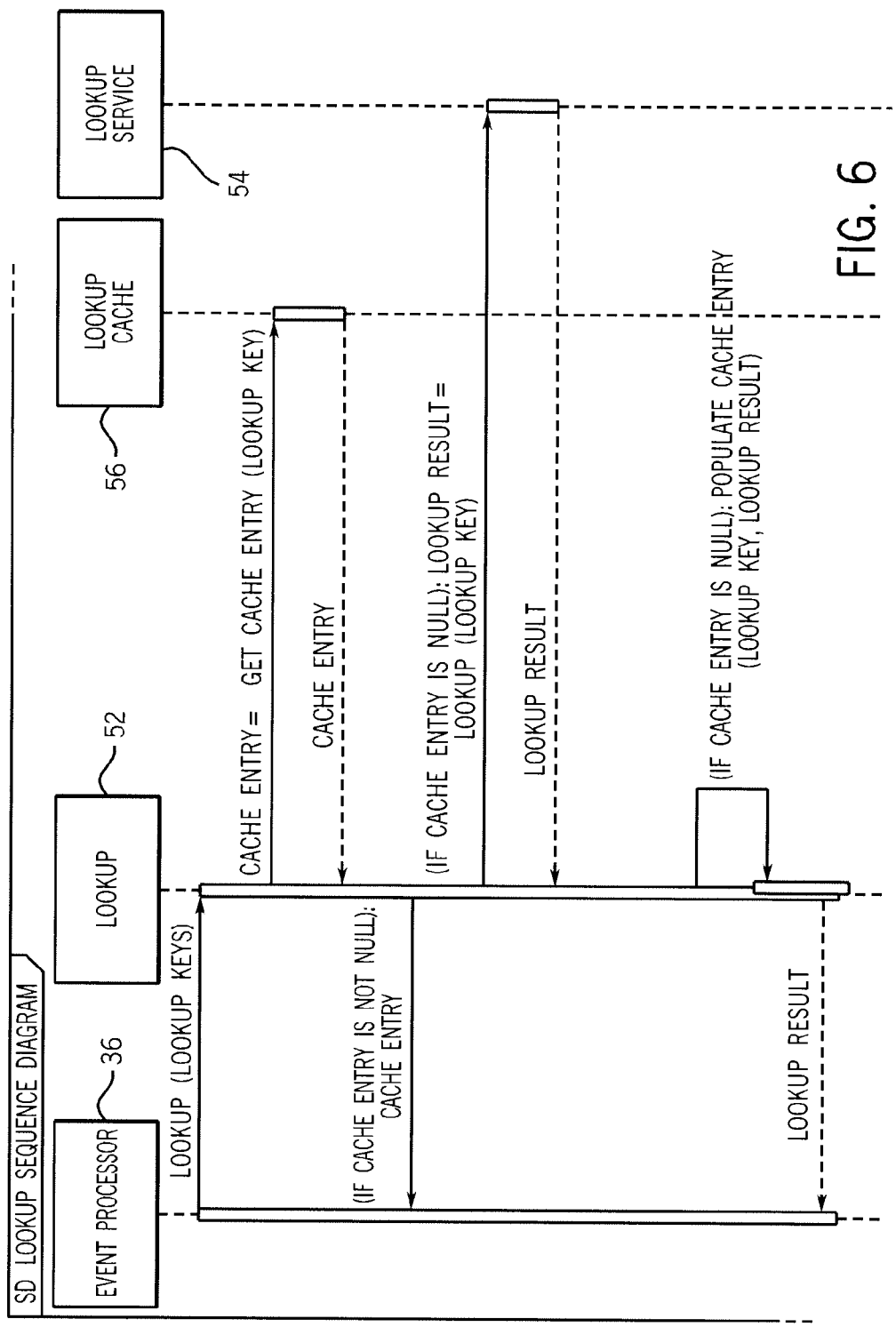
FIG. 6 illustrates the basic flow of the lookup sequence in the event processing framework.

The lookup controller 52 may be responsible for populating and invalidating entries in the lookup cache 56. The sequence diagram shown in FIG. 6 illustrates how this may be accomplished. As shown in FIG. 6, the event processor 36 sends a request to the lookup controller 52. The lookup controller 52 checks the lookup cache 56 to see if the requested data is available. If the data is available from the lookup cache 56, then the lookup controller 52 returns the requested data to the event processor 36. If the requested data is not available in the lookup cache 56, then the lookup controller 52 requests the data from the services 13 using the lookup service 54. The lookup services 54 are adapters that represent the gateway between the amortization engine 12 and external services 13 such as the cash flow service 22, the policy service 18, and the collateral characteristics service 16.

In one embodiment, the lookup controller 52 may be implemented to support synchronous/blocking invocations. This may be desirable in order to relieve the need for workflow/state management functionality and to allow the event processor 36 to perform efficiently. However, it should be appreciated that in other embodiments the lookup controller 52 may be implemented to support asynchronous invocations. In these embodiments, the lookup controller 52 may be provided with workflow management functionality.

In some embodiments, it may be desirable to employ caching to increase the efficiency of the overall accounting system 8. For example, caching may be used in the amortization engine 12 to reduce unnecessary calls to the external services 13 and to facilitate caching algorithms peculiar to the client application. For example, the lookup controller 52 may employ local caching using the lookup cache 56 for this purpose. Caching may also be used by one or more of the services 13 to avoid excessive calls to the database servers.

The amortization system 10 may also employ caching at other locations where it would be beneficial. Also, depending on the specific needs of the application any of these caches may be turned on or off when the amortization system 10 is being configured.

Figure 7:
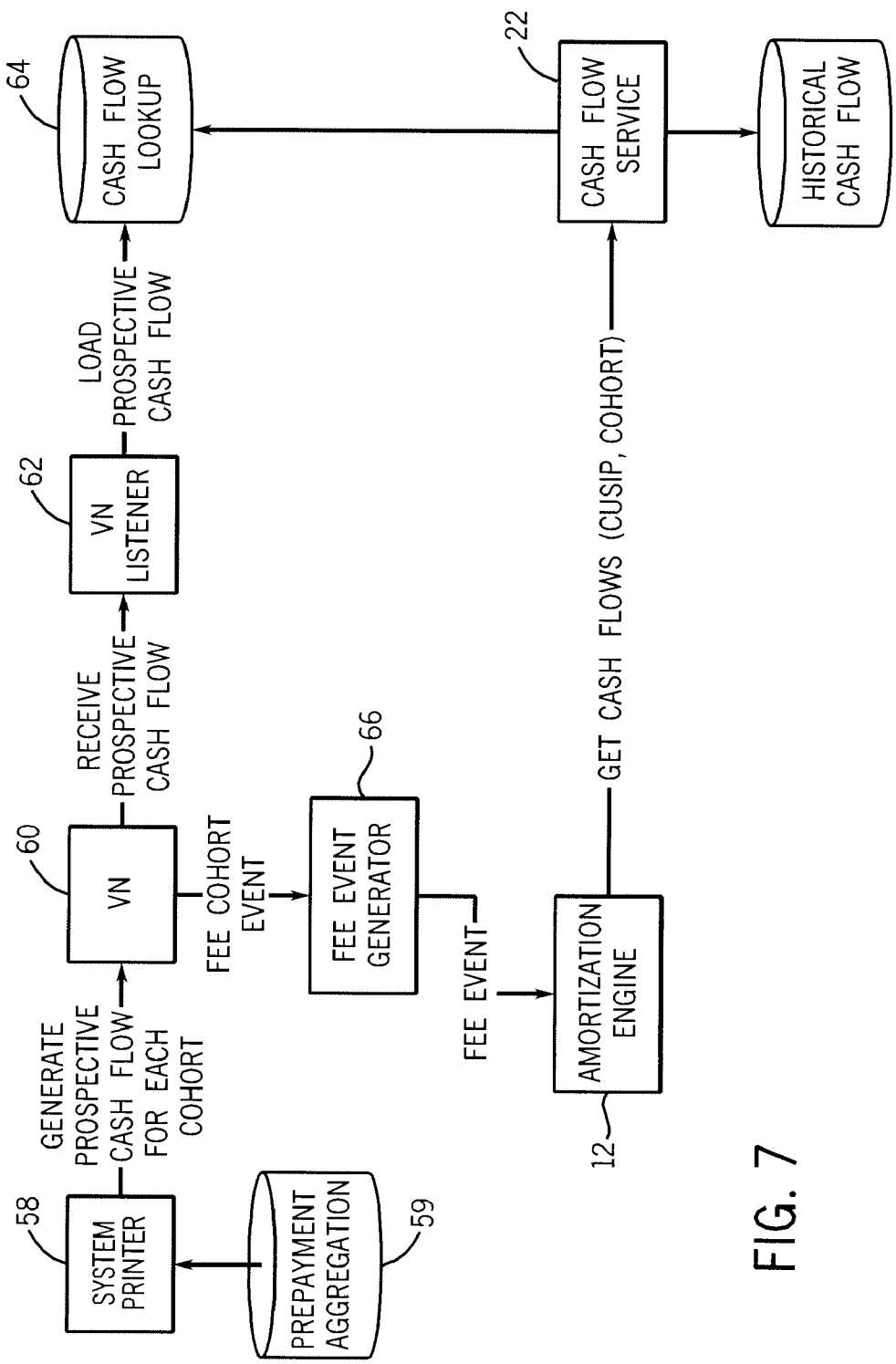
FIG. 7 shows a diagram of one embodiment of an accounting system that includes an system primer to pre-load data which is processed by the accounting system.

Referring to FIG. 7, in one embodiment, the amortization system 10 may include a system primer 58 which is used to pre-load the cohort-common prospective cash flows from a specific accounting period. This may be particularly useful when using the amortization system 10 to reprocess high quantities of data such as historical cash flows. Once the cohort-specific cash flows have been loaded to the cash flow service lookup table, the system primer 58 may be used to generate events such as deferred price adjustment events that act as inputs to the amortization engine 12.

Each event that needs to be amortized may belong to a cohort. For example, each deferred price adjustment may belong to a cohort. An aggregation of all the deferred price adjustments of a cohort can derive a prospective cash flow factor set. Prepayment aggregation cohorts may be defined in a database table 59, which can be accessed by the system primer 58.

Each cohort may be made up of one or many financial instruments, which are identified by a CUSIP. Each financial instrument in a cohort has associated deferred price adjustments and those deferred price adjustments are a subset of the deferred price adjustments that make up a cohort. Historic cash flows are maintained at the instrument level and each deferred price adjustment associated with an instrument has the same historic cash flows.

FIG. 7 shows the system primer 58 workflow. On a start event, the system primer 58 retrieves each prepayment cohort from the prepayment aggregation table 59. For each cohort, the system primer 58 calls on the valuation network 60 to generate prospective cash flows. The valuation network listener 62 receives the prospective cash flows for the cohort and then stores the cash flows in the cash flow service lookup table 64.

Once all of the prospective cash flows for the current cohort have been pre-loaded, the valuation network listener 62 generates a group deferred price adjustment event for the current cohort and causes the event generator 66 to start submitting a cohort event for the current cohort. The amortization engine 12 requests historic (by CUSIP) and prospective cash flows (by cohort id) using the sequence shown in FIG. 6. The amortization engine 12 initially requests the historic and prospective cash flows from the amortization engine lookup cache 56, and if that is not available, from the cash flow service 22. If the historic and prospective cash flows are retrieved from the cash flow service 22, the amortization engine 12 stores the full cash flow, indexed by CUSIP and cohort in its local or lookup cache 56. This allows cash flows for each deferred price adjustment of the same instrument to be retrieved directly from lookup cache 56 rather than making a call to the cash flow service 22.

Once the amortization engine 12 has processed each cohort, the amortization engine 12 invalidates and discards all cash flow and characteristics for that cohort stored in the lookup cache 56. This minimizes the size of the lookup cache 56. It should be appreciated that both the amortization engine 12 and the cash flow service 22 may maintain a cache of the cohort information. The Amortization Engine 12 may maintain the cache in RAM or temporarily on a disk. In one embodiment, one or both of the lookup cache 56 and the cache in the cash flow service 22 may be emptied upon completion of the processing of each cohort.

It should be appreciated that an "event" as that term is used herein refers to a data construct that is constituted to represent an actual occurrence or happening. Business events are events that represent business operation occurrences, whereas accounting events are events that are constructed to signify the occurrence of a business event that has accounting significance. In concordance with these definitions it can be said that for every business event created, zero or more accounting events are generated. Zero accounting events occur whenever a business event has no accounting significance. It should be noted that accounting events can be generated even if no business events have occurred.

There are several concepts that are helpful to describe in order to better understand the event based processing of the amortization system 10. One of these concepts is event timeliness. Event timeliness refers to events arriving to be processed on time. An event can never arrive before the actual occurrence it represents has happened. If this happens, the amortization system 10 may be configured to flag the event as being fraudulent. Events can arrive much later, however, and the fact that it has arrived late can change the interpretation (i.e., the accounting treatment) of the event. For example, if an event arrives late it may no longer be relevant or another set of accounting policies may be applied.

Within the context of amortization and accounting, late arriving events cannot be invalidated. Instead they may be evaluated in another way based on their arrival time. For example, if a deferred price adjustment event arrives after a period is closed (i.e., a late event), then that event should be processed against the next period and as a consequence the late event can probably result in an adjustment to the current or prior period as dictated by accounting policy. If the notion of event grouping is employed so that the amortization engine 12 is simulating a bulk processing oriented architecture, the possibility of experiencing late events may be reduced, but not eliminated.

In one embodiment, systems that interface with the amortization engine 12, which operates in real time, may rely on periodic batched processing to complete their work. Thus, the events from these systems may need to be processed by the amortization engine 12 in groups. The groups of events may be demarcated by accounting policy defined periods such as monthly, daily, or any other suitable period.

The amortization engine 12 may be configured to monitor the processing of groups of events from inception to completion, giving statistics reporting on the processing progress of each group of events. In order to monitor the processing progress of a group of events, two pieces of information may be used; the group id and the total number of events that belong to that group. In one embodiment, each event may carry that information as part of the event's metadata.

Additional concepts that may be helpful to describe in order to better understand the event based processing of the amortization system 10 are event reprocessing and event resubmission. Event reprocessing refers to the practice of resubmitting an event that has already been successfully processed. Successful processing suggests that results have already been persisted. Reprocessing may be desirable whenever data that constitutes an event, or data that was retrieved via a lookup while processing that event has been updated, and that update can cause a difference in the result produced by processing the event. Since results were already created and persisted for a candidate reprocessing event, this means that those results that were previously created can be removed, overwritten, invalidated, or versioned, and the newly created results can take their stead. Alternatively, those old results can remain in place, and the newly created results can be used to ascertain what the difference in the results would be. The latter approach may be desirable in order to determine the materiality of dependent data corrections. Notification of a relevant change may be accomplished by an event broadcast from the data source system.

In certain instances, it may be necessary to resubmit an event for processing. Event resubmission may be desirable whenever errors are associated with an event that cause the event not to be processed to its completion. An essential differentiator between the concepts of event resubmission and event reprocessing is that event resubmission is used when no results were created.

In one embodiment, every event processed by the amortization engine 12 contains one or more of an event identifier, group identifier, group count, event type, and event creation timestamp. This information may be provided as part of the metadata associated with each event. It should be appreciated that a particular event or group of events may have any combination of this information included as metadata.

In one implementation of the amortization engine 12 where deferred price adjustments are being processed, each event that is processed by the amortization engine may include an accounting policy defined aggregation of deferred price adjustment records. This aggregation of deferred price adjustment records may be referred to as a cohort event as described previously. In effect a cohort event represents a collection of deferred price adjustment occurrences. These cohorts may be created in order to meet modeling constraints related to the accurate prediction of future cash flows of security or loan entities that may be too small to forecast for. In addition this aggregation affords some performance benefits, including the use of batch prepared statements to persist deferred price adjustment level results for each cohort as well as providing the possibility of caching of historical cash flow factor data. In one embodiment, the input manager 34 is used to prepare cohort events.

A data change event indicates that a data item has changed. This event has attributes describing the type of the data object, the unique identifier for this object, and current state of the object. A data change event may result in reprocessing of other affected events as explained previously.

In addition to events that are input into the amortization engine 12, other events may be generated by the amortization engine 12 during processing. For example, statistic events, group complete events, and abort processing events may be generated during processing. Each of these events is described in greater detail.

A statistic event includes statistic information available at the event level. The information in this event includes the current component name, the event metadata, the start processing time, and the end processing time. This event is processed by the statistic processor 38 and the results are output to the statistics table for later analysis.

A group complete event is created by the output controller 50 and subsequently processed by a group complete processing manager. The purpose of a group complete event is to notify the group complete processing manager that a group of events has been successfully processed to completion. This means that the relevant output managers 48 have output all their accounting results. The group complete event can contain the group id of the group that has been completed.

An abort group processing event is created by the amortization engine management user interface and is used to indicate when a particular group should no longer be processed. The information in this event includes the group identifier and the stop or abort flag, which indicates whether or not processing for this group is to be aborted or merely stopped. Aborting a group involves flushing the input queues 32 of all events/messages assigned to that group id and a total discard of all relevant group status statistics. Stopping a group allows for the relevant events in the input queues to drain into the input managers 34 where they are sent to the stop processing component 40 and tallied as if they were undergoing normal processing. No results are created for aborted or stopped groups.

Messaging is the primary means for communication between components in the amortization engine 12. In one embodiment, Weblogic implemented JMS compliant queues are used as message conduits. Persistent queues may be deployed.

In one embodiment of the accounting system 8, infrastructure transactional integrity facilities may be used to ensure essential events are not lost. The transactional integrity facilities may be used to ensure atomic behavior amongst persistent data stores like queues and databases. It is also often desirable to monitor the group level processing from when the first cohort event is received by the input managers 34 and the last set of relevant accounting results are output by participating output managers 48. This group level transaction represents the complete processing of a group of events. In one embodiment, this group of events may be defined as all of the events belonging to an accounting period (e.g., monthly, quarterly, yearly, etc.).

This may be accomplished by including metadata for each event that includes both the group id the event belongs to and the number of events belonging to the group. It is the responsibility of the output controller 50 to determine when an event group is completed by examining the metadata of the event, and following the rules of completion as dictated by the event configuration. When an event group is complete, the output controller 50 produces a group complete event that is acted on by the appropriate processing component.

The accounting system 8 may include various security measures and components. In those situations where the accounting system is not accessible by third parties (e.g., outside contractors, Internet, etc.), the need for security measures is significantly reduced. However, even in these situations, it may be desirable to include some measure of security to prevent unauthorized access by personnel that are internal to the financial organization.

The reporting capabilities of the accounting system 8 may be driven off reporting tables that contain data from the amortization engine run. These tables may contain historical as well as current run data allowing for a report auditing process. An amortization run and materiality report can be generated by the system once all the data has been amortized and the resulting output persisted.

One or more user interfaces may be included as part of the accounting system 8. The user interfaces may be used to manage the behavior of the system externally. The amortization system 10 may be configured to allow users to interface with the system in three main ways. The first is through an amortization engine management user interface which allows the user to startup and shutdown the amortization engine 12. The second is through a group management user interface which allows users to terminate group processing. The third is through a runtime statistics user interface which allows users to access accurate and up to date statistics representing the amortization engine's processing performance. This may include the state of processing for a particular group, the number of events processed from inception, the number of events processed within a certain timeframe, and the current rate of event processing.

In order to facilitate auditing of the accounting system 8, everything that is received and produced may be recorded. Information that may be recorded includes cohort events (including the objects that were used to form the cohort such as the deferred price adjustment for a particular cohort), cash flows (both historical and future cash flows), characteristics (related loan and characteristic data may be persisted), and/or amortization results (including the current amortization result, the total amortization schedule result, and the catch up). These results may be conveniently tied together by group id at the highest level and by the event id at the lowest level. Each group id may be associated to a particular period or other accounting relevant characteristic of the group.

The framework components of the amortization system 10 may be highly configurable. Configuration elements for each component may be generated to specify the particular configuration for that component. Table 6 shows one embodiment of configuration objects and associated configuration elements along with a description of each.

TABLE 6

| Configuration Area | Configuration Elements | Description |
|---|---|---|
| Event | Event Name | The unique name of this event |
| | Input Manager | The input manager that can receive this event. |
| | Processing Component | The processing component that can process this event |
| | Output Manager(s) | The output managers that can egest results produced by the processing components |
| | Output Manager Priorities | The priorities that govern the order for which output managers are allowed to egest. This configuration attribute is to be consumed by the Output Controller. |
| | Event Complete Output Manager Set | The set of output managers that may successfully egest in order for this events processing to be considered complete. This configuration attribute is to be consumed by the Output Controller. |
| | Implementation Class | The actual class that holds the events attributes |
| | Event attribute set | This is the set of event attributes that make up this event. This part of the configuration can contain type and validation information, as well as attribute mapping to the implementation class data. |
| Input Manager | Message Context | The Message Context to be used to reference Message Transport objects. |
| | Event Type | The Type of event this Input Manager can expect. |
| | Statistics On | Indicates whether or not processing statistics should be kept. |
| | Implementation Class | The implementation class that constitutes this input manager. |
| Processing Component | Message Context | The Message Context to be used to reference Message Transport objects. |
| | Output Manager(s) | The Output Manager(s) that can receive results generated by the processing component. |
| | Event Type | The Type of event this processing component can expect. |
| | Statistics On | Indicates whether or not processing statistics should be kept. |
| | Implementation Class | The implementation class that constitutes this processing component. |

TABLE 6-continued

| Configuration Area | Configuration Elements | Description |
|---|---|---|
| Output Manager | Message Context | The Message Context to be used to reference Message Transport objects. |
| | Output Result | The result provided by the processing component using this output |
| | Persistence Resource Name | The name of the persistence resource. This could be a queue, table, or file. |
| | Output writer | The class that knows how to write to the persistence resource. |
| | Statistics On | Indicates whether or not processing statistics should be kept. |
| | Implementation Class | The implementation class that constitutes this output manager |
| Output Controller | Message Context | The Message Context to be used to reference Message Transport objects. |
| | Priority Wait Time | This is the amount of quiescent time that may past before lower priority output managers should be allowed to egest. |
| | Statistics On | Indicates whether or not processing statistics should be kept. |
| Statistics Manager | Statistics On | Indicates whether or not processing statistics should be kept. |

In one embodiment, error handling in the accounting system 8 may be as follows. Errors within the service layer 13 can be organized into two categories: processing/runtime errors, and critical/catastrophic errors. All processing errors (and critical errors, if possible) may be handled and logged in a consistent manner. If persistent error capture is desired, this can be implemented in an asynchronous manner (via JMS) so as not to disrupt the primary service request/response.

Several techniques can be employed to handle runtime errors that occur within service boundaries, depending upon the severity. Severe processing errors may include invalid and/or null input parameters passed on invocation, runtime errors in the underlying database or distributed cache, or runtime errors resulting from bugs in the implementation code. In these situations, an exception can be returned to the client. Less severe processing errors may include missing/incomplete data availability for a portion of a given request (e.g., a given security within a cohort), or other warnings. In situations where the requested data cannot be retrieved from an external source, default data can be returned instead. Additionally, threshold mechanisms may be configured within the services to indicate how many warnings and or data errors could occur for a given request before a severe exception is propagated.

Critical errors include database server failure, enterprise java beans (EJB) or other J2EE facilities failure, network problems/failure, and/or other platform hardware/software (OS) disasters. The services 13 may be deployed within a clustered application server configuration to allow failure if a particular instance experiences a unique hardware crash. If a synchronous service invocation is in process during such a crash, the client can be able to retry for a predefined number of attempts or period. In one embodiment, a service software recovery harness may not be required in the event a system-wide disasters occur since the services are stateless and do not persist data.

In one embodiment, the creation of security and/or loan cohorts may not be performed by one of the services 13. Rather, this may be done externally to the services 13. The service APIs may support lookups for the cohorts. In another embodiment, the creation of security and/or loan cohorts may be performed by a cohorting service that is part of the services 13. In this embodiment, separate lookup is not needed for the cohorting service.

As mentioned previously, the amortization system 10 may be used to process a number of deferred price adjustments. The function of each service 13 in this context is described in greater detail as follows. The amortization service 14 may be configured to be in charge of producing an amortization schedule given a set of deferred price adjustments, historic and prospective cash flows, cost basis, product characteristics, and policy. The amortization service 14 is made available to the amortization engine 12 via the lookup interface. All of the rules that govern the amortization of a set of deferred price adjustments are maintained by policy.

An amortization workflow service may be configured to be in charge of maintaining the workflow pertaining to amortization. More specifically, the amortization workflow service understands what is required to amortize a particular set of deferred price adjustments. It is in charge of retrieving this information in the required form needed by the amortization service 14.

Figure 8:
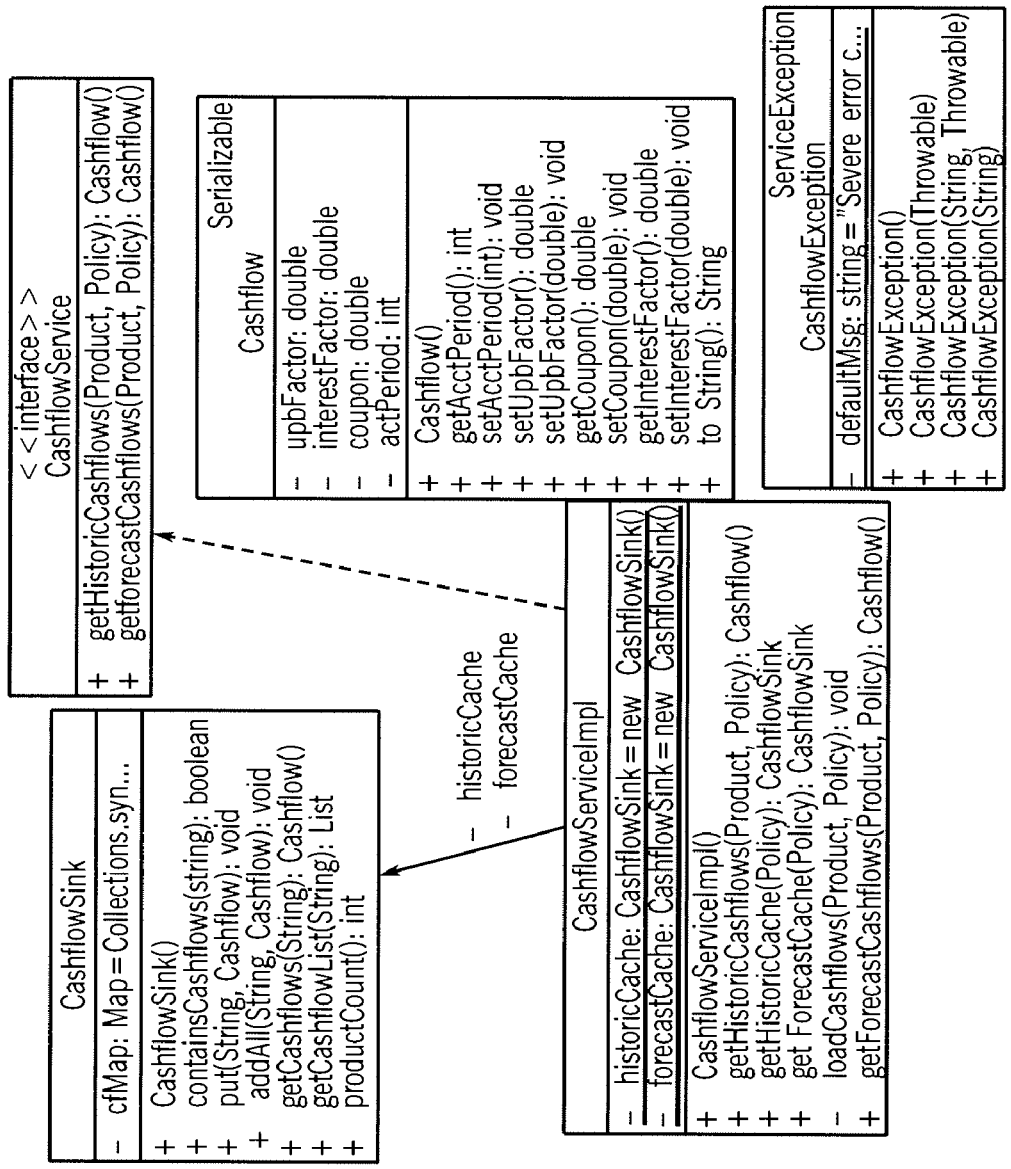
FIGS. 8-10 show class diagrams of the cash flow service, product characteristics service, and cost basis service.

The cash flow service 22 provides a centralized lookup for retrieving "as-of" dated historic and forecast cash flow factors for the given loan or security product(s) passed. This service de-couples the client from the actual forecasting/modeling system, and the interface complexities. The cash flow service 22 may include a cache that includes historic and prospective cash flow factors for both securities and loans. If cash flow factors are not available for a given request, they may be requested subsequently from the valuation lookup service (see below). The realization of missing cash flows can be accomplished in a number of ways. For example, null values can be returned, an exception thrown, or a combination (for cohort/bulk requests). This behavior may be configurable within the cash flow service 22 at startup. FIG. 8 shows one embodiment of a class diagram for the cash flow service 22.

The collateral characteristics service 16 provides a centralized mechanism to retrieve "as-of" dated attributes about loan or securities collateral on demand. A consistent view of this information is available to clients for any number of product types. Among the attributes included in the characteristics are coupon, term, original par, weighted average cost (WAC), weighted average loan age (WALA), etc. for a given product or product type. Collateral characteristics invocation examples include security characteristics such as coupon, term, cash flow profile for a REMIC, security characteristics such as for a PC, or loan characteristics for a loan.

The product characteristics for a product can be requested by specifying an accounting period, in which case the product characteristics service returns the product characteristics for that period. When a client requests the characteristics for a product without specifying an accounting period, the cost basis service 20 returns the product characteristics at the time of acquisition (or any default period agreed upon).

Figure 9:
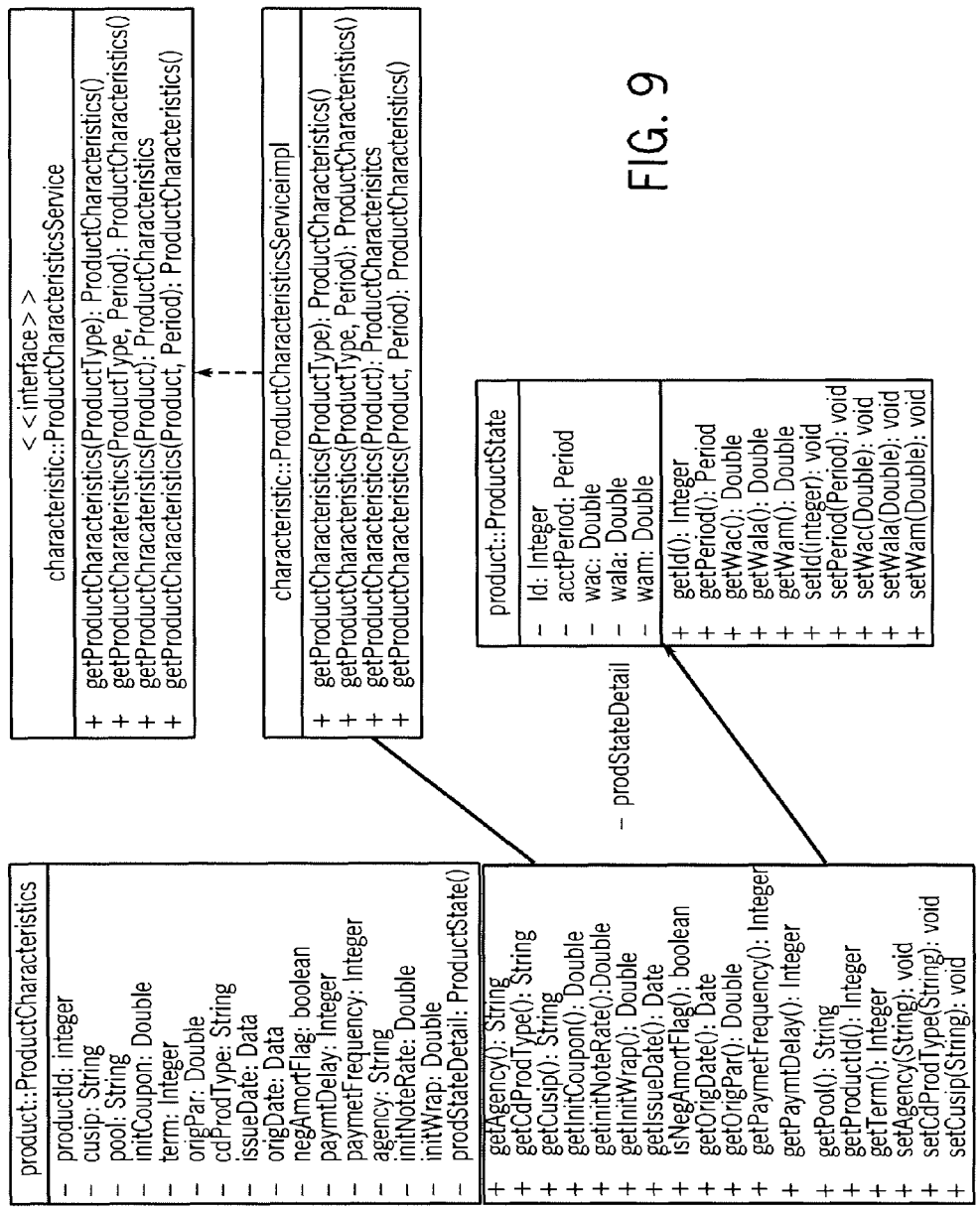

When a client requests the characteristics for a product type, the product characteristics service returns the product characteristics array for that period. If all the characteristics for securities are not available in the database, they may be requested subsequently from the valuation lookup service. The realization of unavailable characteristics by the requesting client can be accomplished in a number of ways as described in connection with the cash flow service 22. For example, null values can be returned, an exception thrown, or a combination of both (for cohort/bulk requests). FIG. 9 shows one embodiment of a class diagram of the product characteristics.

Figure 10:
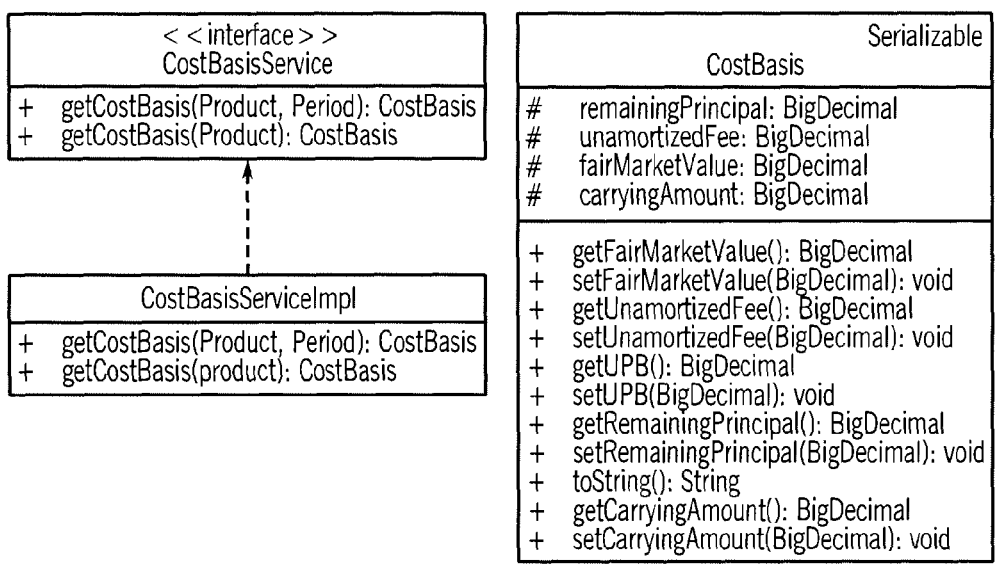

The cost basis service 20 provides a means for obtaining remaining principal balance (UPB), unamortized net deferred price adjustment balances, fair market value and carrying amount on a given product. The CostBasis class provides a container for the combination of these balances. FIG. 10 shows a class diagram of the cost basis. The cost basis for a product can be requested by specifying an accounting period, in which case the cost basis service 20 returns the balances as of that period. When the cost basis for a product is requested without specifying an accounting period, the cost basis service returns the cost basis at the time of acquisition.

The accounting policy service 18 serves as a centralized repository of "versioned" accounting policies/rules. In one embodiment, the accounting policy service 18 may be used to provide consistent use of accounting rules across all systems of a financial institution. Examples include retrieving the amortization method by product type, determining whether or not EITF 9920 Rules apply for a given product type, and finding the cohort scheme for estimating prepayments.

The valuation service is a service which connects to a financial information service, which is external to the accounting system 8, such as Bloomberg. The valuation service provides security characteristics and/or cashflows using the FTP protocol. In one embodiment, the file I/O, authentication and licensing details, data decryption, etc. has been wrapped within a session EJB facade for this service. In one embodiment, the valuation service may be most used during the pre-loading of cash flows, rather than dynamically by the amortization engine 12 at runtime. Essentially, missing/incomplete cash flows can be known during pre-load, and managed at that time.

The following is a detailed discussion of a generic embodiment of the event processing framework used in the amortization engine 12. It should be appreciated that although the implementation of the event processing framework is described herein largely for the purposes of amortization (e.g., as implemented by the amortization engine 12), the framework itself is generic and can be used for a wide variety of applications, which can be built on top of it in a very short amount of time.

The event framework is the foundation for the development of the service oriented architecture (SOA) application. This framework can be described as having four subsystems: Input, event processing, lookup, and output. In general, the input components (e.g., event queue 32, input manager 34) of the event framework are used to receive information from external sources into the event framework and convert them into framework usable events. The event processing components (e.g., event processor 36, statistics processor 38, stop processing component 40) receive input events from the input framework's input infrastructure and utilize the external services 13 to process these events to generate results. The lookup components (e.g., lookup controller 52, lookup service facade 54, lookup cache 56) are utilized to find and invoke services 13 external to the event framework. Output components (e.g., queues 42, 44, 46, output manager 48, output controller 50) are used to take results that have been generated by the event processors 36 and persist them in a prioritized manner.

A manager or processor (e.g., input managers 34, output managers 48, event processors 36, etc.) is the central point of control for each subsystem in the event framework. Applications can be developed using this framework by extending the functionality of each of the subsystem managers or processors. This allows developers to create applications by simply extending the framework managers for input, output, lookup, and event processing with application specific business logic.

The input infrastructure of the event framework is responsible for receiving information from external systems and transforming that information into a series of events scheduled for processing by relevant event processors. The input infrastructure is composed of an input reader, input manager, input manager context, and several event senders.

Figure 11:
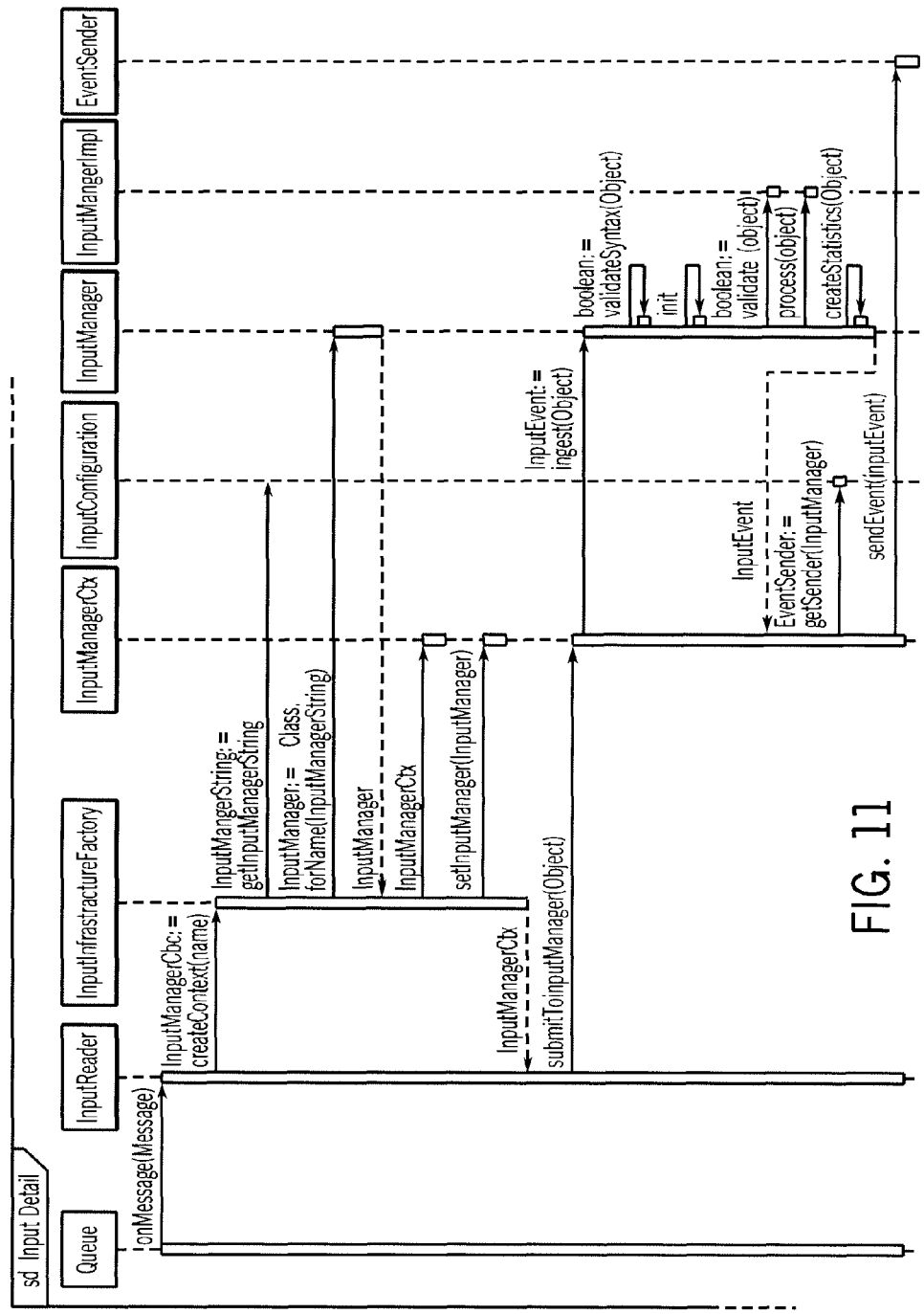
FIG. 11 illustrates the basic flow of the input infrastructure in the event processing framework.

The sequence diagram shown in FIG. 11 illustrates the basic flow of the input infrastructure. The following describes the responsibilities of each component outlined in this sequence diagram.

The input reader is responsible for interfacing with external data sources. The input reader receives a pre-defined data constructs from a pre-determined data conduit or data resource. One example of this would be the reception of a deferred price adjustment cohort subset event from a JMS queue. Another example of this would be the reading of a deferred price adjustment table in a database. For each data construct read by the input reader, the input reader can request the input infrastructure factory to create an input manager context. The input reader can then request the input manager context to submit this data construct to the relevant specific input manager implementation object.

The input infrastructure factory class contains methods for correctly constructing input managers, input readers, and event senders. Given a defined name the correct object can be returned. This name to class mapping is maintained by the input configuration class.

The input configuration maintains all of the configuration objects for use within the input infrastructure. Given the name for a particular component within the input infrastructure the input configuration class can return the correct configuration object.

The input manager data context serves two purposes. The first is to ensure that the input manager abstract class relationship with the specific input manager implementation is correctly constructed. The second is to enforce the proper invocation of specific input manager implementation objects within the event framework container.

The input manager super class is responsible for performing syntactic validation checks, as well as calling the specific input manager implementation object's processing methods in the correct order. The sequence diagram above illustrates the order in which these sub class methods are invoked.

Specific Input Manager Implementation Class: The application developer creates input manager implementations in order to provide the specific application level programming logic for inputting data constructs into the event framework. As required by the abstract super classes method contract, this class implements three methods. They are init, validate, and process. Init makes sure the input manager implementation is made ready to begin processing. Validate performs semantic validations against the object received for processing and can throw an exception to indicate a fatal error, or alternatively return an array of warnings. Process actually converts this successfully validated data construct into a set of events, where each event in this set is mapped to a single relevant event processor. These events are returned to the input manager abstract super class by the process method. In the case of a fatal error, the process method can throw an exception.

Event Sender: The event sender is invoked by the input manager context whenever the input manager super class returns an array of events. For each event in the array the input manager context can query the event for its name, use that name to ask the input infrastructure configuration master for the event sender name associated with this event. It can then ask the input infrastructure factory to create this event sender. Then it can invoke the event sender method with the event object as its parameter. The event sender can then send this event to a pre-determined event receiver via a direct or indirect call.

Every data construct that is processed by the input infrastructure may result in an event being created. If that data construct generates a fatal error, an event indicating that error is created and submitted to the fatal error event processor for recording. Once the events resulting from the data construct are submitted to the event processor and the event processor returns successfully, the safe reception of the event can be acknowledge by the input reader.

It should be noted that there are two ways to send an event—by direct call or by indirect call. Indirect call based event senders generally rely on queues to send events. These queue based event senders extend the implementation of direct call event senders.

It should be noted that the architecture of the event framework allows for different types of input readers to be created. These input readers may specialize in reading from queues, files, or databases.

The event processing infrastructure of the event framework receives events from the input infrastructure and processes them by utilizing appropriate services, external to the framework. In one embodiment, all the business logic associated with the handling of an event may reside within the scope of the event processor. The event infrastructure is composed of an event reader, an event processor implementation, an event processor context, zero or more lookup components, and one or more result senders.

Figure 12:
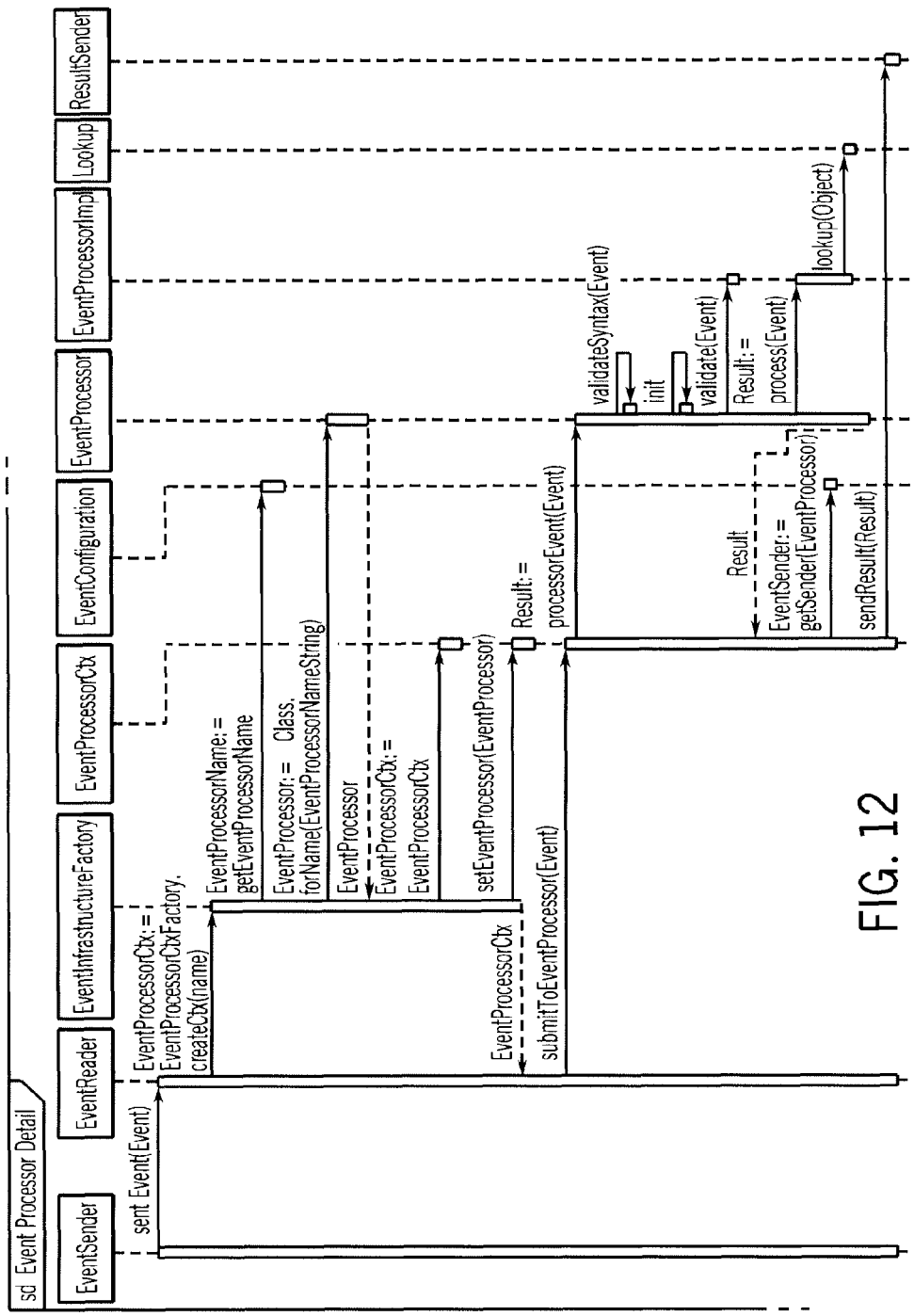
FIG. 12 illustrates the basic flow of the event processing in the event processing framework.

The sequence diagram shown in FIG. 12 illustrates the basic flow of the event infrastructure. The following describes the responsibilities of each component outlined in FIG. 12.

Event Reader: The event reader receives events from the input framework via a direct or indirect call. The nature of the call can be specified at configuration time. Once the event has been received it is the responsibility of the event reader to use the framework configuration to create the appropriate event processor and pass the input event to the event processor, via the event context for processing.

Event Infrastructure Factory: This class contains methods for correctly constructing event processors, event readers, and result senders. Given a defined name the correct object can be returned. This name to class mapping is maintained by the event configuration manager.

Event Configuration: The event configuration maintains all of the configuration objects for use within the event infrastructure. Given the name for a particular component within the event infrastructure, the event configuration can return the correct configuration object.

Event Processor Context: The event processor data context serves two purposes. The first is to ensure that the event processor abstract class relationship with the specific event processor implementation is correctly constructed. The second is to enforce the proper invocation of specific event processor implementation objects within the event framework container.

Event Processor Super Class: The event processor super class is responsible for performing syntactic validation checks, as well as calling the specific event processor implementation objects processing methods in the correct order. The sequence diagram shown in FIG. 12 illustrates the order in which these sub class methods are invoked.

Specific Event Processor Implementation Class: The application developer creates event processor implementations in order to provide the specific application level programming logic for inputting data constructs into the event framework. As required by the abstract super classes method contract, this class implements three methods. They are init, validate, and process. Init makes sure the event processor implementation is made ready to begin processing. Validate performs semantic validations against the event received for processing and can throw an exception to indicate a fatal error, or alternatively return an array of warnings. Process actually converts this successfully validated data construct into a set of results, where each result in this set is mapped to a single relevant output manager. These results are returned to the event manager abstract super class by the process method. In the case of a fatal error, the process method can throw an exception.

Result Sender: The result sender is invoked by the event processor context whenever the event processor super class returns a result. For each result in the array the event processor context can query the result for its name, and use that name to ask the event processor configuration for the result sender name associated with this result. It can then ask the event processor infrastructure factory to create this result sender. Then it can invoke the result sender method with the result as its parameter. The result sender can then send this result to a pre-determined result receiver via a direct or indirect call.

Every data construct that is processed by the input infrastructure may result in an event being created. This event is passed on to the Event Processing Framework. If that data construct generates a fatal error, a default fatal error encountered event is created and submitted to the error event processor for processing. Every event that is processed by the event processor infrastructure may cause a result to be created. If that data construct generates a fatal error, a default fatal error encountered event is created and submitted to the error event processor for processing.

It should be noted that there are two ways to send a result—by direct call or by indirect call. Indirect call based result senders generally rely of queues to send events. These queue based result senders extend the implementation of direct call result senders.

It should be noted that the architecture of the event framework allows for different types of event readers to be created. The event readers may be called by direct call or by indirect call through queues.

The lookup infrastructure of the event framework is responsible for accessing external services and retrieving information from those services back to the event processors. The lookup infrastructure is composed of a lookup factory, lookup, lookup cache, and a specific lookup implementation. Lookups are expected to be called from event processors.

Figure 13:
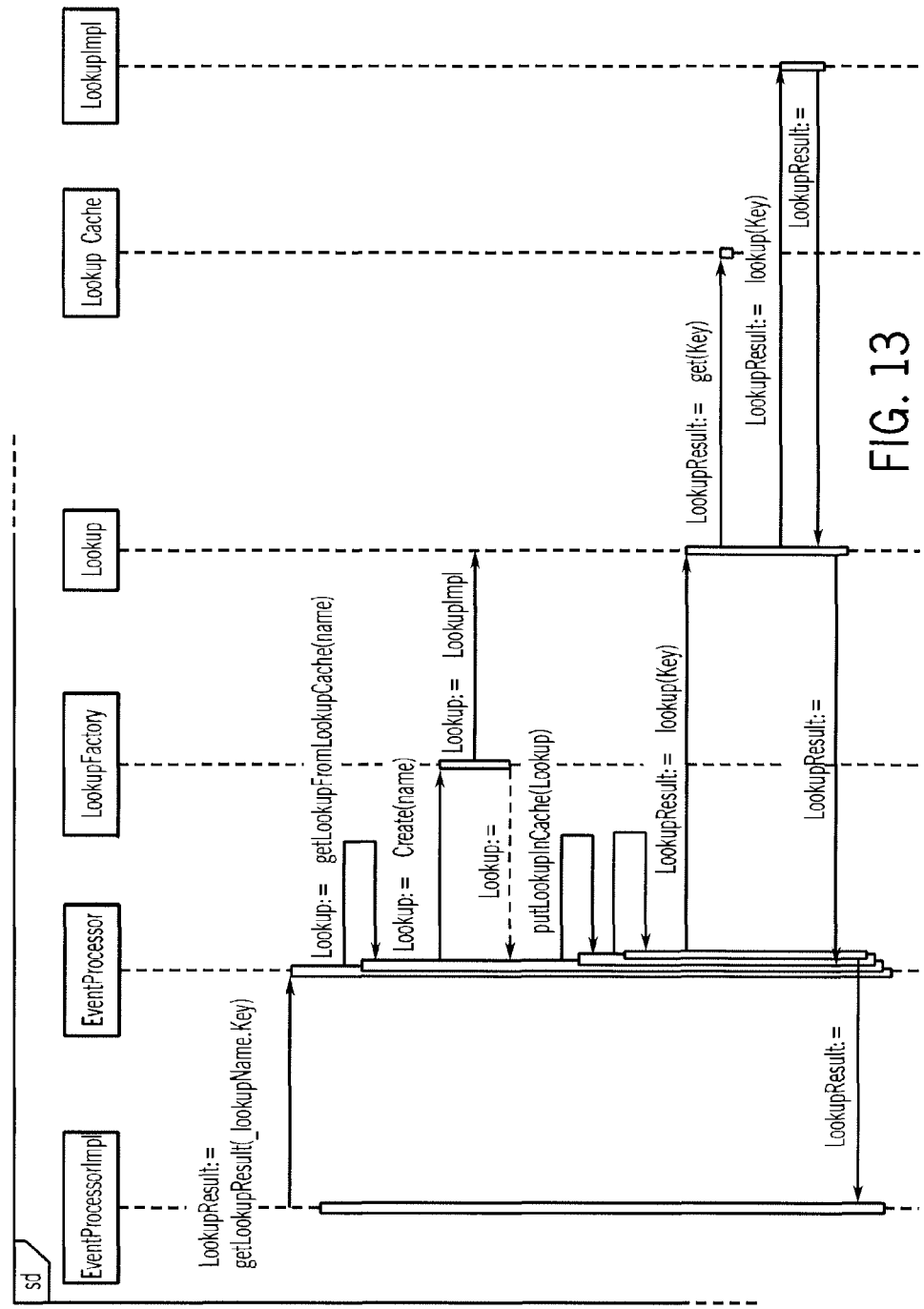
FIG. 13 illustrates the basic flow of the lookup infrastructure in the event processing framework.

The sequence diagram shown in FIG. 13 illustrates the basic flow of the lookup infrastructure. The following describes the responsibilities of each component outlined in FIG. 13.

Event Processor Implementation: The specific event processor implementation class invokes the super class getLookupResult method, supplying it with both the lookup name and the key object.

Event Processor: This abstract class contains a concrete method to retrieve lookup results from applicable services. The event processor can maintain a local map of lookup objects. This map can be used to contain previously created lookup objects. If the lookup to be exercised is not in the map, the event processor can ask the lookup factory to create a new lookup object, place that lookup object in the cache, then exercise the lookup object. The returned lookup result can be passed back to the event processor implementation.

Lookup Factory: The lookup factory is responsible for creating lookup objects by name.

Lookup Configuration: The lookup configuration object is responsible for containing all information needed to execute a lookup. This includes the lookup name, type, key values, and returned lookup results.

Lookup: This abstract class contains a concrete method that manages the lookup cache and the interface to the specific lookup implementation. Results returned by the lookup are cached locally and returned to the calling event processor. The lookup uses a specific lookup implementation class that is supplied by the particular event framework application.

Lookup Cache: The lookup Cache is a localized store of key to lookup result pairs. This information is lost along with the lookup once the lookup is garbage collected. The lookup cache can be invalidated on at the key level.

Specific Lookup Implementation Class: The application developer creates lookup implementations in order to provide the specific application level programming logic for invoking services within the event framework. As required by the abstract super classes method contract, this class implements three methods. They are init, validate, and lookup. Init makes sure the lookup implementation is made ready to begin processing. Validate performs semantic validations against the key received for processing and can throw an exception to indicate a fatal error, or alternatively return an array of warnings by way of the lookup result, whilst the lookup method actually invokes the external service. Lookup results are returned by the lookup method.

Every key that is processed by the lookups may result in a lookup result being created. If that data construct generates a fatal error, an exception may be thrown. Any warnings accompanying a lookup result may be attached to the lookup result itself.

It should be noted that the architecture of the event framework allows for different types of lookups to be created. These lookups may specialize in invoking different types of service, including EJB, web services, or direct calls.

The output manager of the event framework receives results from results receivers and coordinates the egest of results to persistent storage. The output controller prioritizes output managers such that higher priority results are persisted prior to lower priority results, largely independent of the order in which the results are generated. The output infrastructure is composed of result readers, an output managers implementation, an output manager context, output writers, and an output controller component.

Figure 14:
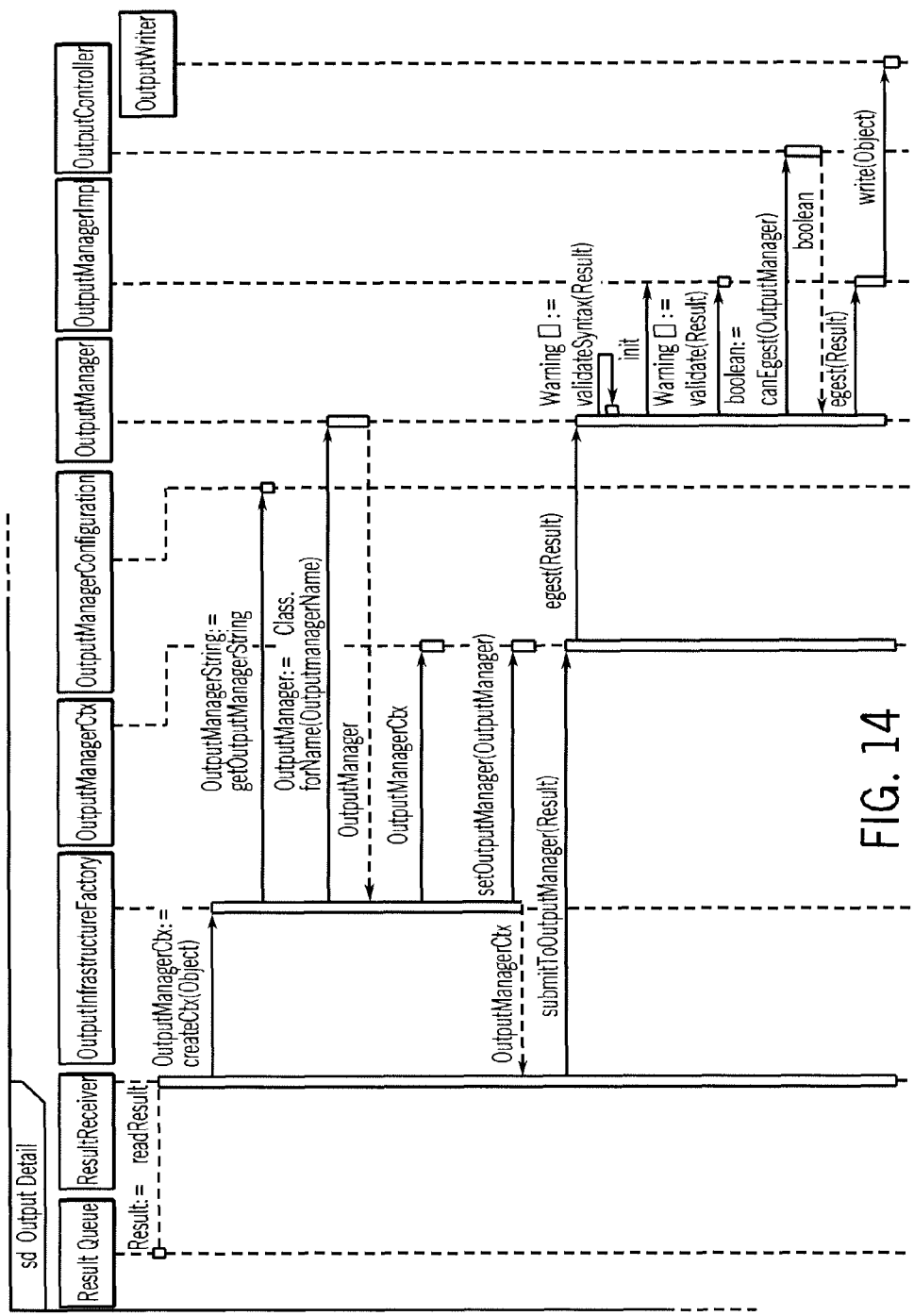
FIG. 14 illustrates the basic flow of the event infrastructure in the event processing framework.

The sequence diagram shown in FIG. 14 illustrates the basic flow of the event infrastructure. The following describes the responsibilities of each component outlined in FIG. 14.

Result Receiver: The result receiver receives events from the event framework via a direct or indirect call. The nature of the call can be specified at configuration time. Once the event has been received it is the responsibility of the result reader to use the framework configuration to create the appropriate output manager and pass the result to the output manager, via the output manager context for persistence.

Output Manager Factory: This class contains methods for correctly constructing output managers, result readers, and output writers. Given a defined name the correct object can be returned. This name to class mapping is maintained by the event configuration manager.

Output Manager: The output configuration maintains all of the configuration objects for use within the output framework. Given the name for a particular component within the output infrastructure, the output configuration can return the correct configuration object.

Output Manager Context: The output processor data context serves two purposes. The first is to ensure that the output manager abstract class relationship with the specific output manager implementation is correctly constructed. The second is to enforce the proper invocation of specific output manager implementation objects within the event framework container.

Output Manager Super Class: The output manager super class is responsible for performing syntactic validation checks, as well as calling the specific output manager implementation objects processing methods in the correct order. The sequence diagram shown in FIG. 14 illustrates the order in which these sub class methods are invoked.

Output Controller: The output controller takes an output manager implementation and determines, by querying configuration, if the output manager has a high enough priority to begin egesting result data to persistence.

Specific Output Manager Implementation Class: The application developer creates output manager implementations in order to provide the specific application level programming logic for outputting data constructs out of the event framework to a specified repository. As required by the abstract super classes method contract, this class implements three methods. They are init, validate, and process. Init makes sure the output manager implementation is made ready to begin processing. Validate performs semantic validations against the object received for processing and can throw an exception to indicate a fatal error, or alternatively return an array of warnings. The process method can query the output controller to see if this manager currently has the correct priority level to egest result data for persistence. If yes, then the results data is passed to the configuration-defined output writer. If the output manager implementation does not have the correct priority to begin implementation, it can block and re-query priority levels after a configuration defined time delay. In the case of a fatal error, the process method can throw an exception.

Output Writer: The output manager invokes the output writer whenever the output controller determines that the output manager results have a high enough priority to be persisted. An application developer can create specific implementation of output writers that can allow persistence to any user-defined repository. Which output writer type that is utilized for a type of output manager can be defined at configuration time.

Every result that is processed by the output infrastructure may result in a data object being created. This data object is persisted to outside data store or conduit (e.g., the data object can be written to a database, file, or queue). Every data construct that is processed by the output infrastructure may result in a result being egested. There can be a null output manager that can be used to persist a result to a bit bucket.

It should be noted that the architecture of the event framework allows for different types of result receivers to be created. The result receivers may be called by direct call or by indirect call through queues. It should also be noted that the architecture of the event framework allows for different types of output writers to be created. Output writers may write to queues, databases, file systems, or any other persistence repository as needed.

The following is a description of the various framework classes in the event processing framework. The input package contains all the classes needed to carry information from the outside world into the event processor environment. The responsibility of the input package is to interface with external data resources and convert them into events that can be consumed by the engine. The input infrastructure is designed to provide facilities for most input related activities, allowing the application developer to focus on creating an input manager class that specializes in implementing the required business logic.

Figure 15:
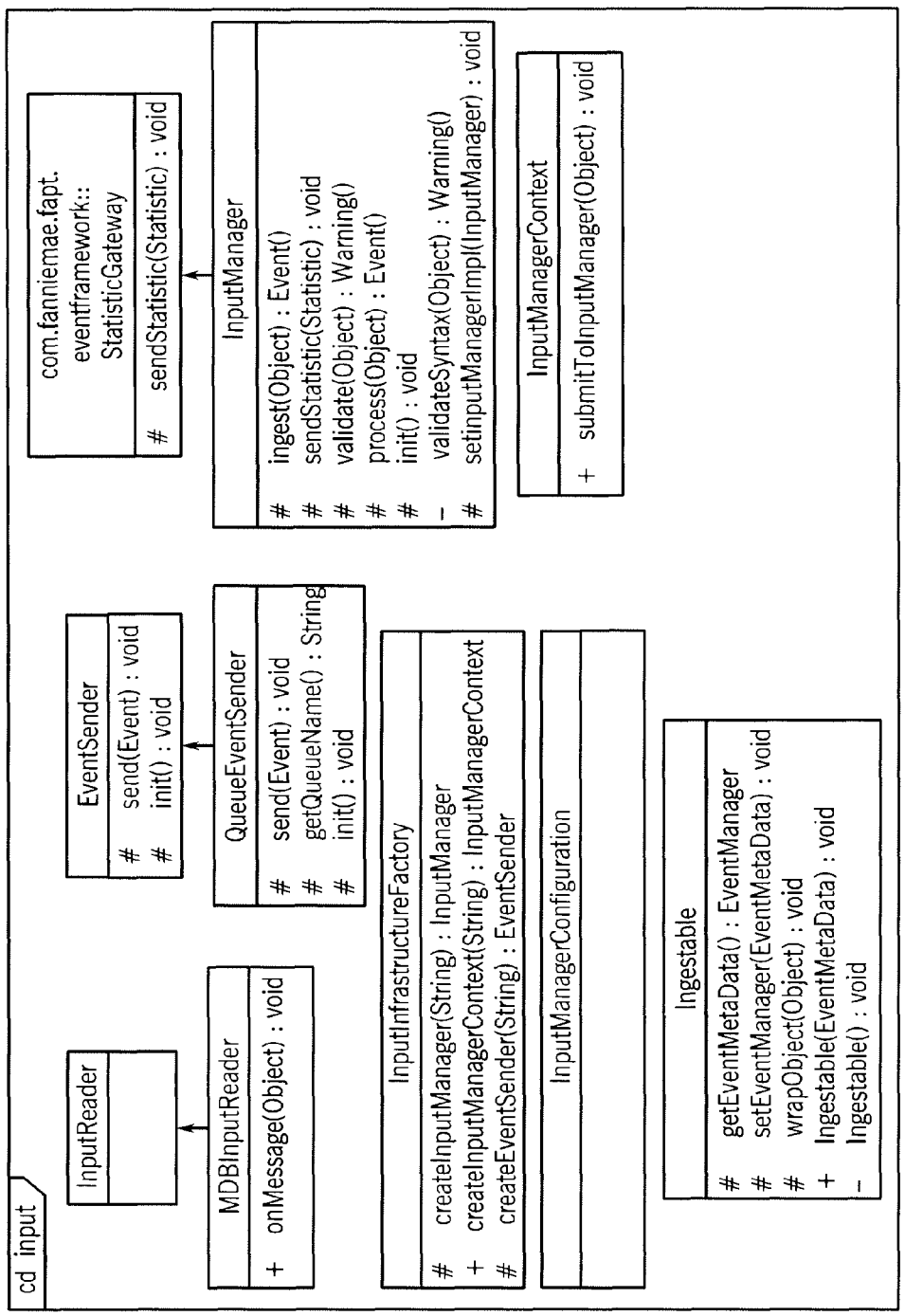
FIGS. 15-21 show class diagrams of the various components of one embodiment of the event framework.

The diagram shown in FIG. 15 illustrates some of the classes that may be included in the input package. Central to the input package is the input manager. The InputManager class contains the methods needed to interface with a particular input manager implementation. It also contains the sendStatistics operation, which all sub classes of the input manager class can inherit. This method is the central means for reporting statistics to the outside world. Information received by this method can be submitted to the statistics application for processing.

The input infrastructure can be separated into three main sections. The first section interfaces directly with the outside world and consists mainly of a class that extends the InputReader class. Descendents of this class can be expected to understand how to interface with different data resources and conduits. These can include JMS queues, databases, file systems, or other types of resources.

The second section consists of the object recognition, validation, and conversion section. In this section, the specific input manager implementation class is the workhorse of this section. The methods that are implemented by this class, are orchestrated by the abstract InputManager class, and are not to be called directly by the input reader classes. As such, abstract methods defined by the InputManager class are protected. Input managers are expected to create events from the ingested objects they receive from the input readers.

All input events can extend the Ingestable abstract class. The Ingestable super class can process and persist the event metadata prior to processing the event. Input events are wrapped and validated by the Ingestable object.

Specific input reader objects are only able to interface with the specific input manager implementation object via the input manager context. The input manager context provides a useful buffer between readers and input managers, as well as between input managers and event processors. As such the context provides a straddle across the three main layers of the input infrastructure.

The third section involves interfacing with the event processor infrastructure. Events are forwarded to the event processor infrastructure via event senders. Event senders interface with event receivers, and accomplish the conveyance of an event either via a direct call or through a queuing mechanism.

Configuration information regarding the input manager, the input readers, ingested objects, events, and event senders are available in the input manager configuration object.

The event package contains the base classes to be used when creating new events for processing within the event framework. There are two main types of events. The first type is the class Event and it is to be used as the base class for creating specific events peculiar to an application supported by the event framework. This class is an abstract class and cannot be instantiated directly. The Event class is required, and its supported operations are described in the diagram shown in FIG. 16.

The event class contains an event metadata class for convenience purposes. This is to allow the derived objects associated with the event to carry the event metadata along with them for audit purposes. The setEventId method is purposefully made protected in order to maintain immutability outside of the specific event implementation.

Figure 16:
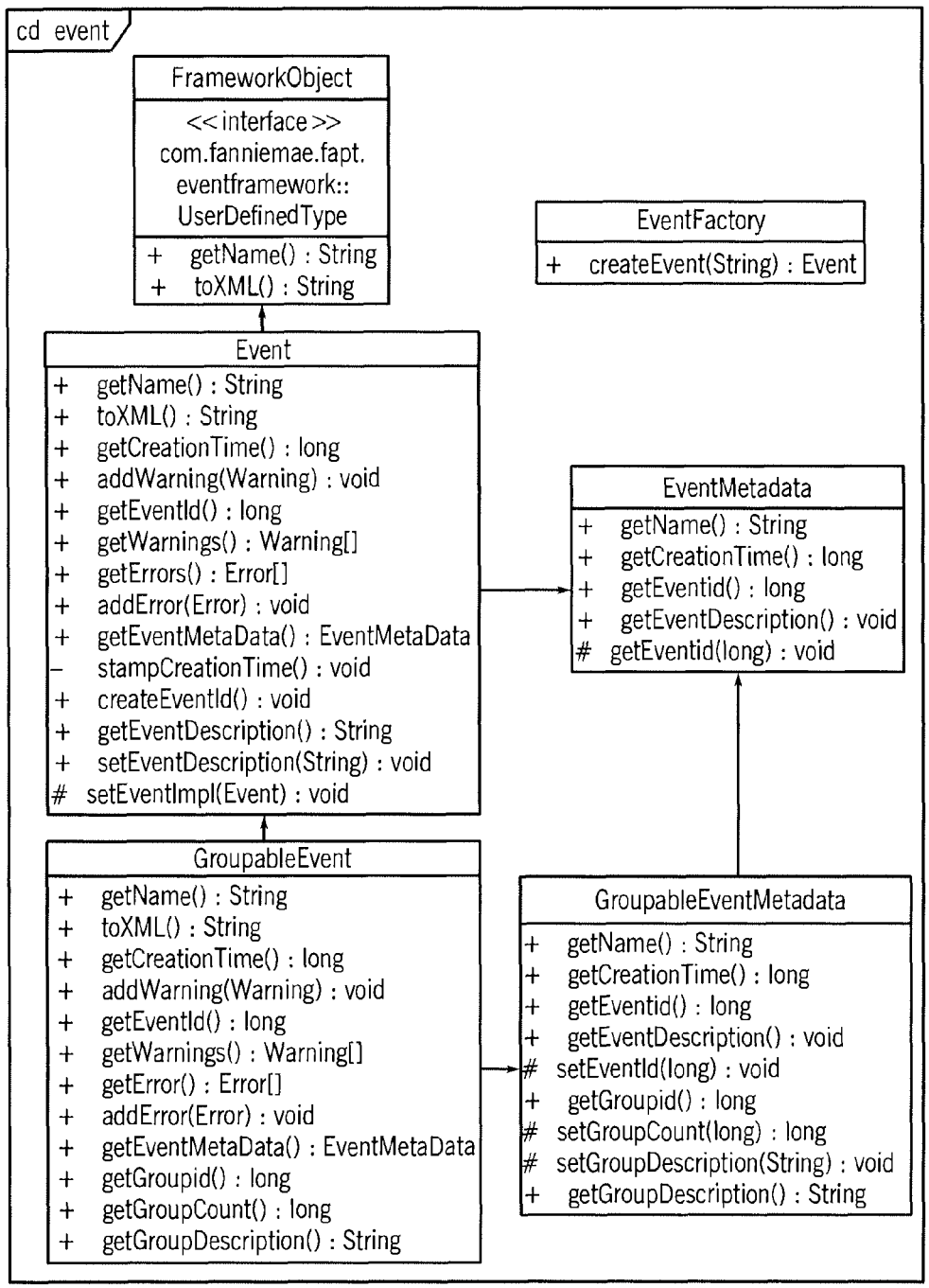

The second type of event is the Groupable Event class. This class is used when an event is to be considered part of a group of events. The Groupable Event class contains group info metadata that can be used to track group level event information as well. The diagram shown in FIG. 16 illustrates some of the classes that may be included in the input package.

The event processor framework package contains all the classes needed to process events received from the input infrastructure, retrieve lookup results from external services, and generate results to be persisted by the output infrastructure. The responsibility of the event processor package is to interface with external services via the lookup framework, and apply relevant business logic, in order to generate a set of predefined results. The second responsibility of the event processor is to send all results to the appropriate output manager for egest. The event processor infrastructure has been carefully designed to provide facilities for generic event processor activities, allowing the application developer to focus on creating an event processor manager class that specializes in implementing the required business logic.

Figure 17:
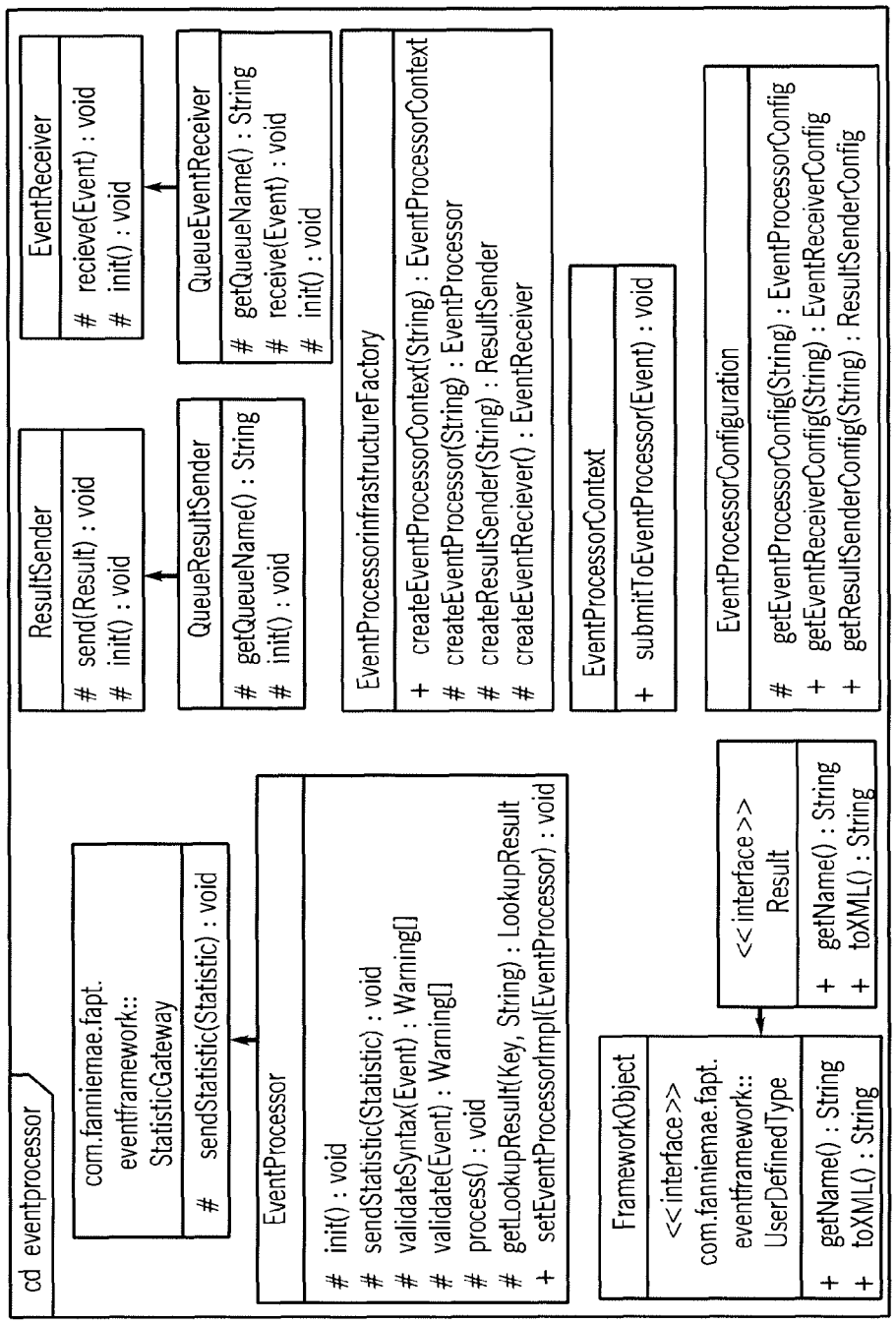

The diagram shown in FIG. 17 illustrates some of the classes that may be included in the event framework package. Central to the event processor package is the abstract event processor. The EventProcessor class contains the methods needed to interface with a particular event processor implementation. It also contains the sendStatistics operation, which all sub classes of the EventProcessor class can inherit. This method is the central means for reporting statistics to the outside world. Information received by this method can be submitted to the statistics application for processing.

The event processor infrastructure can be separated into three main sections. The first section consists of the classes that interface directly with the input framework classes to receive events. This section is managed by the EventReceiver class. EventReceiver is used for synchronous communication with the input framework. In the case of a need for asynchronous communication, a QueueEventReceiver can be deployed instead.

The second section is set of classes that are involved in the actual processing of the event and the generation of results. The workhorse component of this section is the framework-supported application programmer implementation of the event processor. The methods that are implemented by this class are defined in the abstract EventProcessor class, and are not to be called directly by the event processor classes. As such, abstract methods defined by the EventProcessor class are protected. Event processor can process events from the input event infrastructure and generate results that can be sent to output queues.

Specific event processor objects are only able to interface with the specific event processor implementation object via the event processor context. The event processor context provides a useful buffer between event receivers and event processors, and the event processor and the result senders, as such providing a straddle across the three main layers of the event processing infrastructure.

The third section involves interfacing with the output manager layer, which is involved in result persistence. Results are forwarded to the output framework via result senders. Result senders interface with the output manager framework. Results can be sent to the output manager framework through a direct call or a queuing mechanism The lookup infrastructure consists of a set of classes that provide uniform lookup mechanisms for accessing outside information services. These services can vary from a simple database request for information, to complex mathematical operations. For all these services, the central theme is that the service is invoked and provided with a key, and then the service consequently returns an answer called a lookup result.

Figure 18:
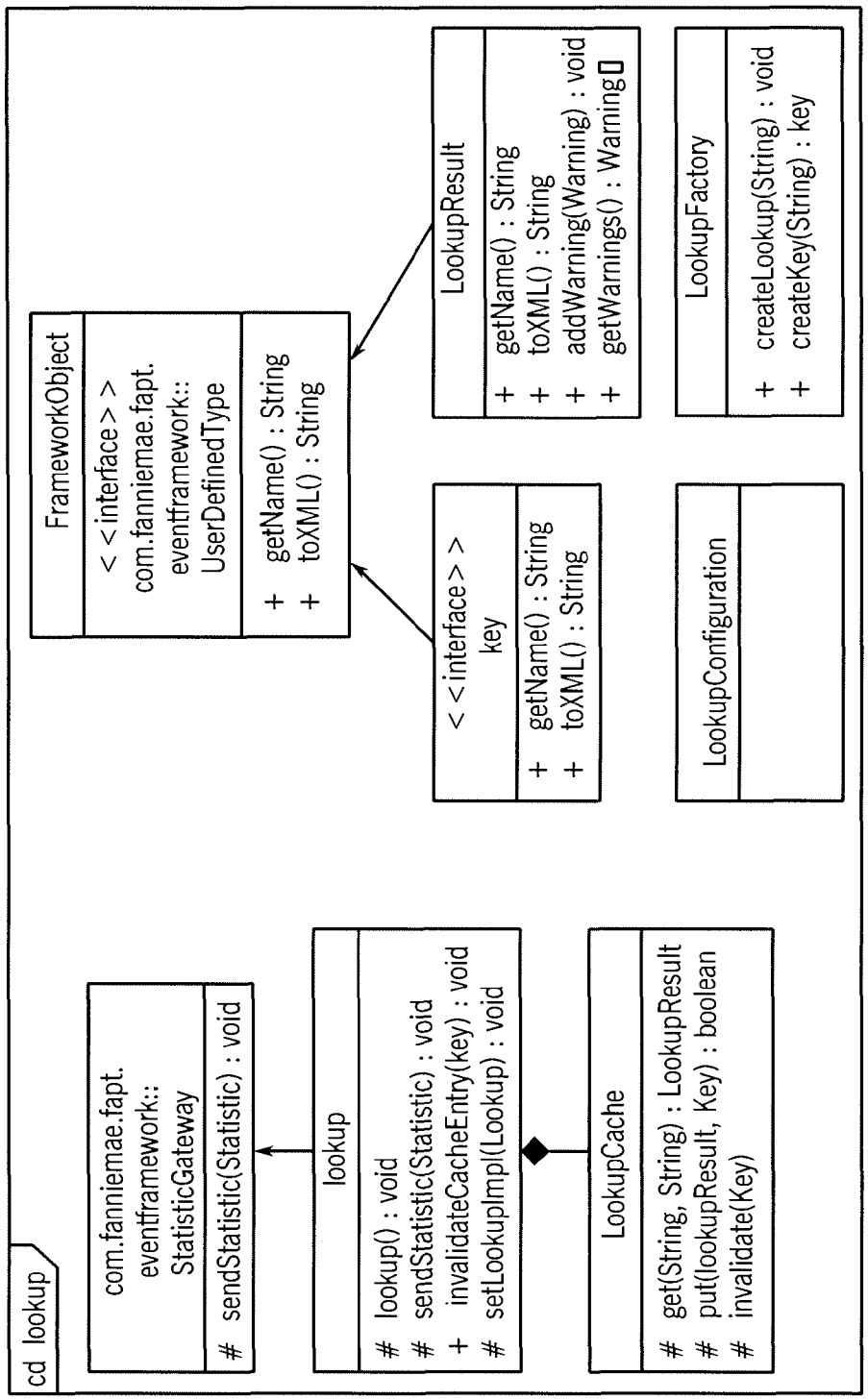

The central class in this architecture is the Lookup abstract class. This class maintains the separation of the event processor infrastructure and the specific lookup implementation. As such it plays the role of a wrapper object around a specific lookup implementation. In addition, the Lookup class provides simple caching abilities to enhance speed of retrieval by way of the lookup cache. The diagram shown in FIG. 18 shows the relationships amongst the classes that make up the lookup infrastructure.

The output manager framework package contains all the classes needed to receive results from the event framework and store them in a persistent repository. The primary responsibility of the output manager package is to receive results from result queues and persist the results. The second responsibility of the output manager framework is to read configuration defined persistence priorities and ensure that only highest priority results are persisted before allowing lower priority results to be persisted. The output infrastructure has been carefully designed to provide facilities for most output related activities, allowing the application developer to focus on creating an output manager class that specializes in implementing the required business logic.

Figure 19A:
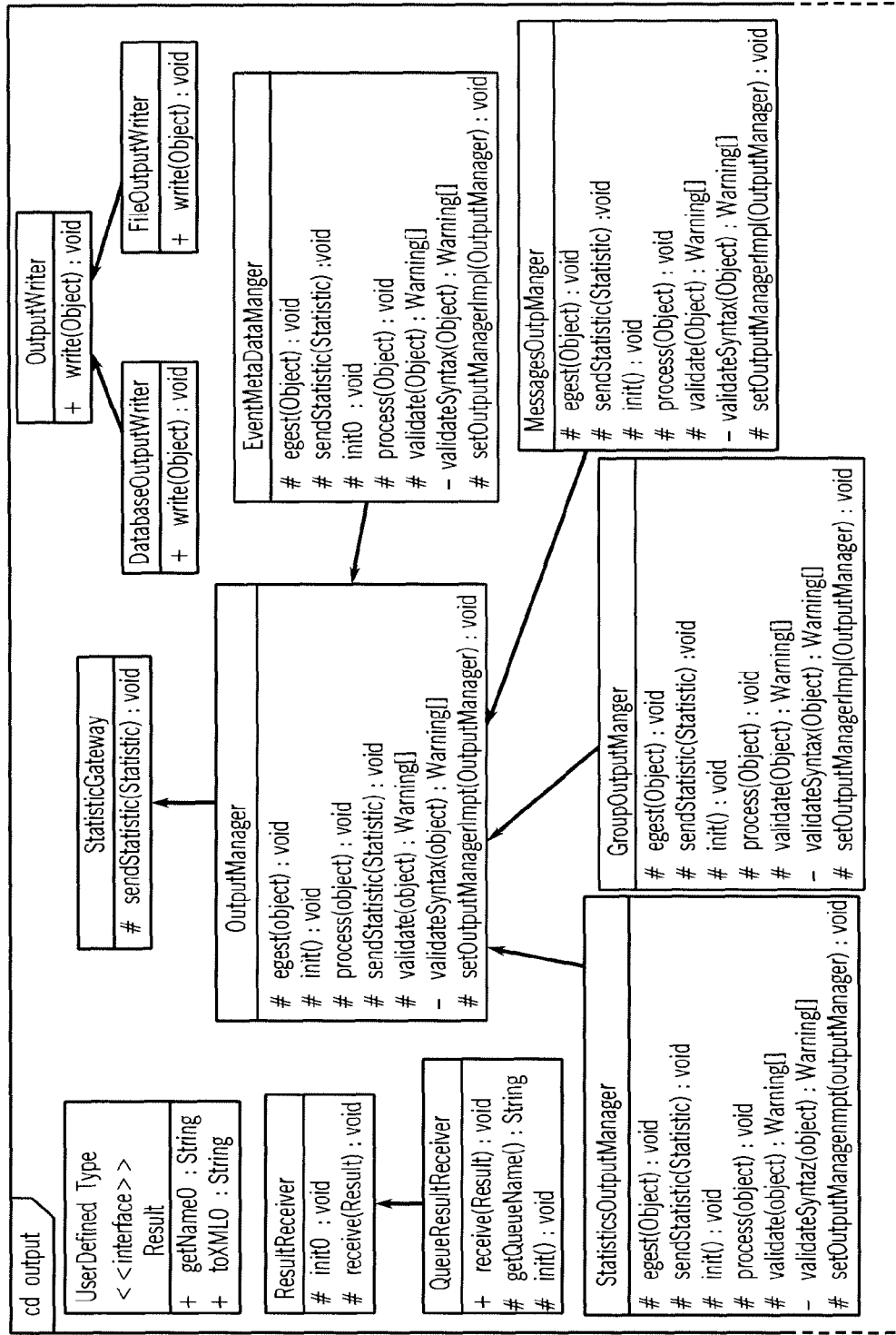
Figure 19B:
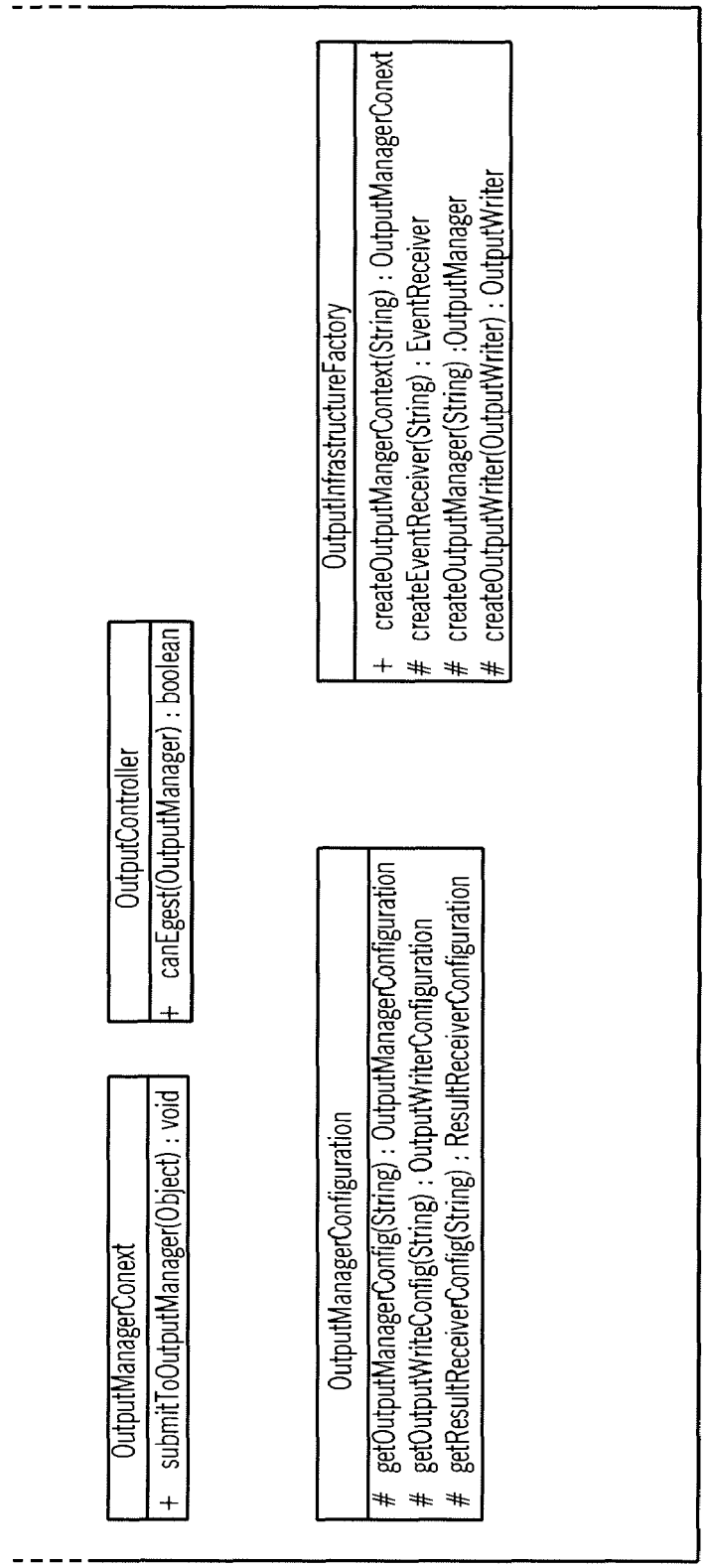

The diagram shown in FIG. 19 illustrates some of the classes that may be included in the output package. Central to the output package is the abstract output manager. The OutputManager class contains the methods needed to interface with a particular output manager implementation. It also contains the sendStatistics operation, which all sub classes of the OutputManager class can inherit. This method is the central means for reporting statistics to the outside world. Information received by this method can be submitted to the statistics application for processing.

The output infrastructure can be separated into four main sections. The first section consists of the classes that interface directly with the event-processing framework via the result queues. The classes in this section receive results from the result queues. This section is made up of two classes, ResultReceiver, and it's child class, QueueResultReceiver. ResultReceiver is used for synchronous communication with the event-processing framework. QueueResultReceiver is used for asynchronous communication with the event-processing framework.

The second section consists of the object recognition, validation, and conversion section. In this section, the workhorse component of this section is the framework-supported application programmer implementation of the output manager. The methods that are implemented by this class, are defined by the abstract OutputManager class, and are not to be called directly by the output writer classes. As such, abstract methods defined by the OutputManager class are protected. Output managers are expected to utilize output writers to output results generated by the event-processing framework.

Specific result reader objects are only able to interface with the specific output manager implementation object via the output manager context. The output manager context provides a useful buffer between result receivers and the output managers, and the output managers and the output writers, as such providing a straddle across the three main layers of the output infrastructure.

The third section involves interfacing with the persistence repository. The output managers can interface with configuration defined output writers. The output writers have various implementations, each of which can know how to persist the results to a particular repository.

The fourth section determines the priority sequence of output. The output controller is a singleton class that can determine if a particular output manager has been given the current highest priority to egest its results to persistence. Output managers may always make a request to the output controller in order to determine priority. If cleared, the output manager can interface with the output writers to egest results. If not cleared, the output manager can wait and check again with the output controller after a configured amount of time.

The event framework can come packaged with certain special output manager implementations that are generic across applications. These output manager implementations include: statistics output manager, group output manager, messages output manager, and event metadata output manager. The statistics output manager collects statistics that have been generated by the event processors and persists them to the statistics tables. The group output manager collects event-grouping information and persists that information to the database. Messages include errors and exceptions that occur during event processing. The event metadata includes event name, event creation time, event id, and event description. Event metadata for each event can be persisted prior to the processing of that event.

Figure 20:
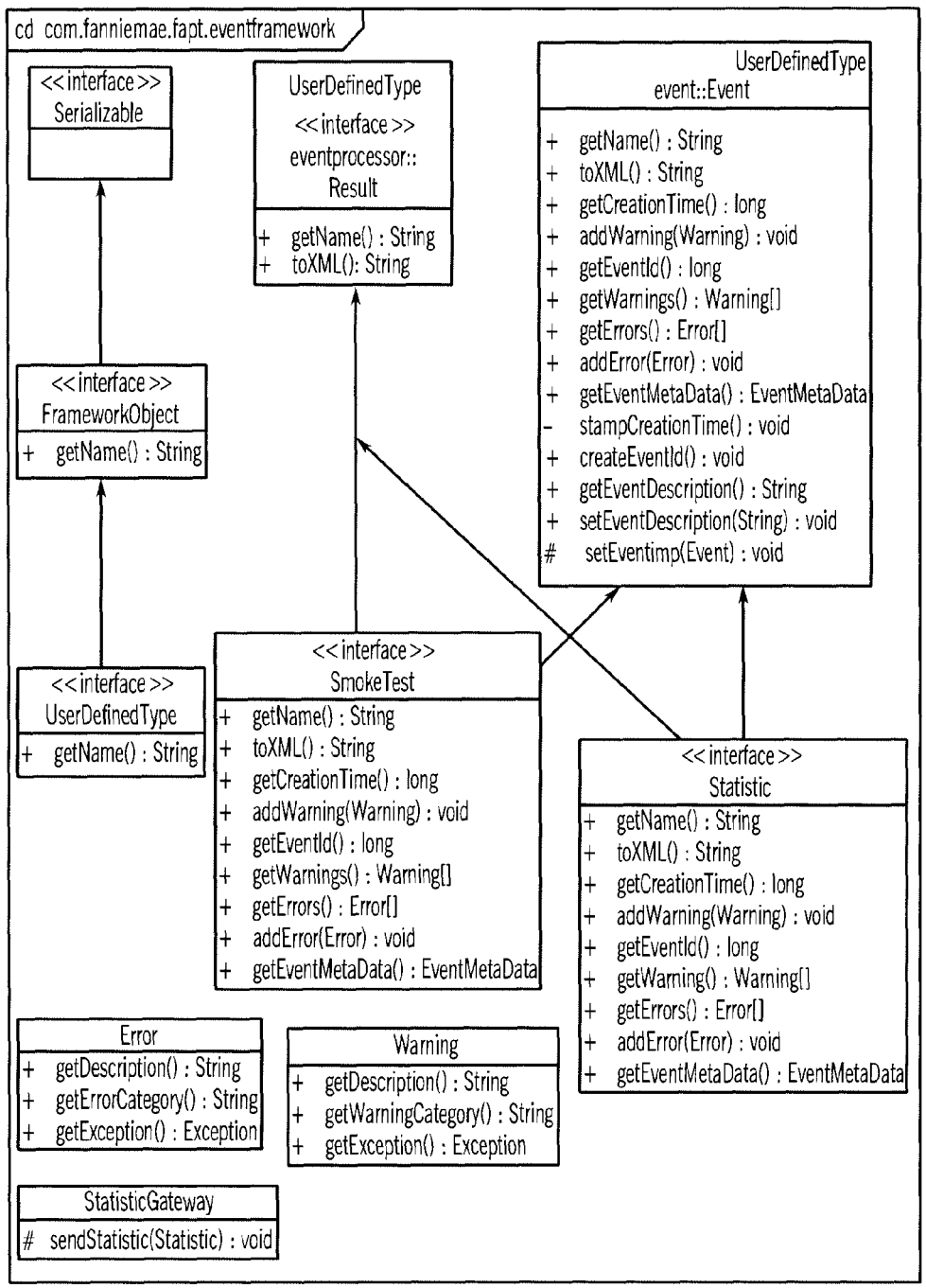

The event framework supporting classes consist of sundry classes that are useful to the input, event processor, lookup, and output packages. Much of the classes in this section are useful to enforce uniform behavior across the event framework. The FrameworkObject interface is one such class. All objects that implement this class are expected to provide a unique name. This uniqueness is verified and validated by the configuration master. The diagram shown in FIG. 20 illustrates some of the classes that may be included in the event framework package.

UserDefinedTypes are specific objects created by the user. These include ingested objects, events, keys, lookup results, and event processor results. It is important to define these objects in configuration because the automated syntactic validation afforded by the InputManager, EventProcessor, Lookup, and OutputManager abstract classes depend on this functionality to operate successfully.

The InputManager, EventProcessor, Lookup, and OutputManager abstract classes extend the StatisticGateway abstract class in order to provide a uniform mechanism for recording business and engine statistics. That mechanism is implemented in its final method sendStatistic.

Both the Statistic and SmokeTest classes are utility classes that behave as both Events and Results. These classes are peculiar to the engine and are provided to fulfill a use utility. They are expected to be used for these utility purposes only, and may be extended if necessary. The SmokeTest class provides an easy way to check to see if the event framework is in order. The Statistics class serves as a conveyer for rudimentary statistical information produced by the engine. Information about the state of processing for a particular event can be recorded using the Warning and Error classes.

Figure 21A:
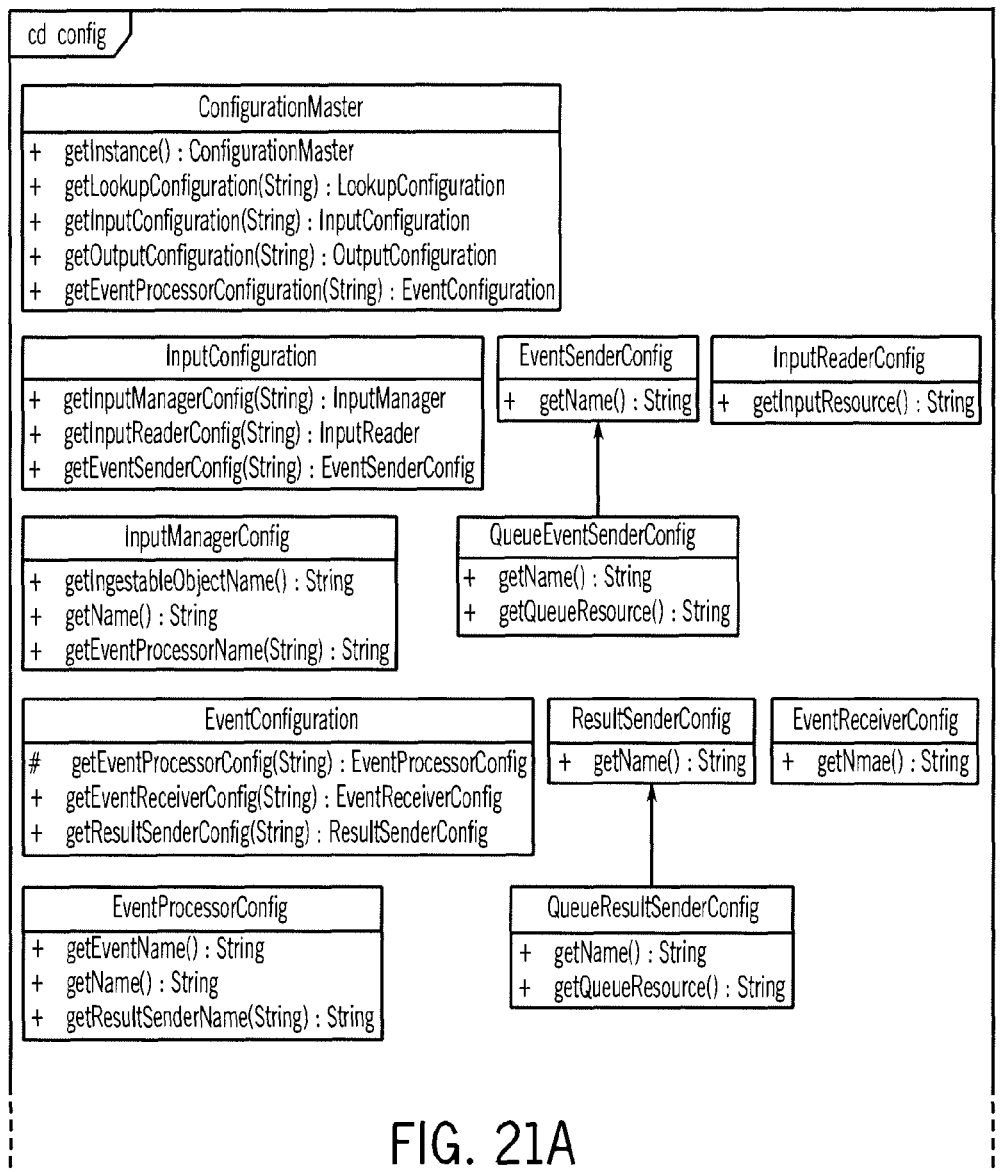
Figure 21B:
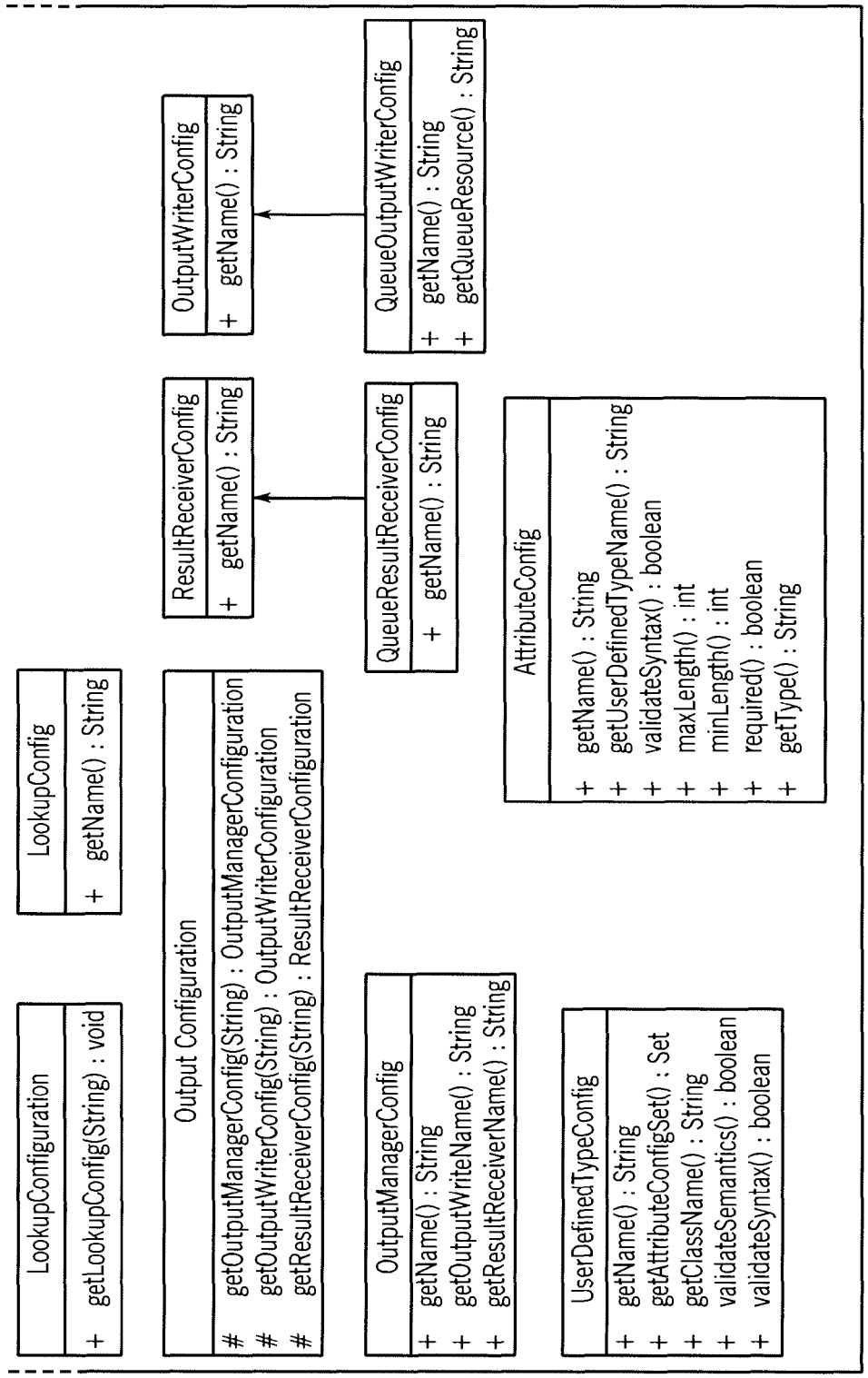

The configuration package is the package that all other packages depend on to ensure smooth operation. Through the configuration package, system components, can identify, locate, validate, and understand, pre-defined objects. The configuration master package contains all the methods necessary to receive information regarding a particular infrastructure package. The diagram shown in FIG. 21 illustrates some of the classes that may be included in the configuration package. Information afforded by the configuration master may be derived from an automatically generated XML document.

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As described above, many of the embodiments of the financial accounting system include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection can properly be termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments may be described in the general context of method steps which may be implemented by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, handheld devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or various portions thereof may include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A financial data processing system comprising:
    memory configured to store programmed instructions regarding secondary mortgage market financial data processing; and
    a processor coupled to the memory and operable to execute programmed instructions, wherein the programmed instructions are configured to provide:
        a service framework which includes a plurality of application services that receive requests for information and reply to the requests with the requested information;
        the plurality of application services including a collateral characteristics service, an accounting policy service, a cost basis service, a cash flow service, and an amortization service configured to obtain, for specified products as of a specified historic period, information regarding collateral characteristics as of the specified historic period, accounting policies as of the specified historic period, cost basis as of the specified historic period, and cash flows as of the specified historic period from the respective services;
        an amortization engine which processes accounting events and generates the amortization schedule for at least one of loans, mortgage backed securities, or guarantee fee items based on the accounting events, the amortization engine being configured to request at least a portion of the information for the specified historic period, from the amortization service to obtain information which is used to generate the amortization schedule;
        the accounting policy service includes a plurality of accounting policies, the accounting policies being used to determine accounting treatment of the accounting events; and
        wherein the amortization engine is configured to request, via the amortization service, an accounting policy from the accounting policy service to determine the accounting treatment to be accorded to the accounting events and the amortization engine configured to generate a materiality report comparing an original amortization schedule based upon a first set of information as of the specified historic period from the application services including a first accounting policy and a revised amortization schedule based upon a second set of information as of the specified historic period from the application services including a second accounting policy.

2. The financial data processing system of claim 1 wherein the second accounting policy comprises a different version of the first accounting policy.

3. The financial data processing system of claim 1 wherein the amortization engine requests historic and/or prospective cash flows related to the accounting events from the cash flow service in order to generate the amortization schedule.

4. A method for generating an amortization schedule in a financial data processing system having memory configured to store programmed instructions, a processor coupled to the memory and operable to execute the programmed instructions, and at least one database, the method comprising:
    archiving to the at least one database an active amortization schedule and information associated therewith;
    requesting information regarding a prior period from an application service, the request for information being sent from an amortization engine of the financial data processing system to the application service, the application service being part of a service framework that includes a plurality of application services which receive requests for information and reply to the requests with the requested information;
    in response to the request for information, sending the information regarding the prior period to the amortization engine, the information being sent from the application service to the amortization service;
    requesting accounting policy information for the prior period, the request for accounting policy information being sent from the amortization engine to an accounting policy service which is part of the service framework; and
    generating via the financial data processing system an amortization schedule for accounting events using the information regarding the prior period from the application service and the accounting policy information from the accounting policy server;
    saving the generated amortization schedule to the at least one database and the information from the application service used in generating the amortization schedule as associated therewith, wherein the saved amortization schedule replaces the archived amortization schedule as the active amortization schedule in an accounting system.

5. The method of claim 4 wherein the accounting events include price adjustments for at least one of loans, mortgage backed securities, guarantee fee items, or combinations thereof.

6. The method of claim 4 wherein the accounting policy information is a first accounting policy and the amortization schedule is a first amortization schedule, wherein the method includes requesting a second accounting policy from the accounting policy service by the amortization engine and generating a second amortization schedule for the accounting events using the second accounting policy.

7. The method of claim 6 comprising comparing at least the first amortization schedule and the second amortization schedule.

8. The method of claim 4 wherein the amortization engine includes an input component, an event processing component, a lookup component, and an output component; and wherein the input component receives the accounting events and converts the accounting events into processable accounting events; wherein the event processing component processes the processable accounting events and generates the amortization schedule; wherein the lookup component cooperates with the event processing component to obtain the accounting policy information from the accounting policy service to generate the amortization schedule; and wherein the output component persists the amortization schedule.

9. The method of claim 4 wherein the information requested from the application service includes historic and/or prospective cash flow information related to the accounting events.

10. A financial data processing system comprising:
memory configured to store programmed instructions regarding financial data processing; and
a processor coupled to the memory and operable to execute programmed instructions, wherein the programmed instructions are configured to provide:
a service framework which includes a plurality of application services that receive requests for information and reply to the requests with the requested information, the service framework including an accounting policy service which includes a plurality of accounting policies, the accounting policies adapted to be used to determine the accounting treatment of accounting events, the service framework also including a cash flow service that includes historic and/or prospective cash flows related to the accounting events; and
an amortization engine which processes the accounting events and generates an amortization schedule based on the accounting events, the amortization engine being configured to request an accounting policy from the accounting policy service, the accounting policy adapted to be used to determine the accounting treatment of the accounting events, the amortization engine also being configured to request historic and/or prospective cash flows related to the accounting events from the cash flow service;
the amortization engine is configured to generate a first amortization schedule using a first version of the accounting policy requested from the accounting policy service and a second amortization schedule using a second version of the accounting policy requested from the accounting policy service;
the amortization engine further configured to generate a materiality report comparing the first amortization schedule based upon a first version of the accounting policy and the second amortization schedule based upon a second version of the accounting policy; and
wherein the amortization engine includes an input component which receives the accounting events and converts the accounting events into processable accounting events, an event processing component which processes the processable accounting events and generates the first and second amortization schedule, a lookup component which requests the accounting policy from the accounting policy service and the historic and/or prospective cash flows from the cash flow service, and an output component which persists the first amortization schedule and the second amortization schedule.

* * * * *